(12) United States Patent
Park et al.

(10) Patent No.: US 10,733,972 B2
(45) Date of Patent: Aug. 4, 2020

(54) ELECTRONIC APPARATUS AND METHOD FOR OPERATING SAME

(71) Applicant: Samsung Electronics Co., Ltd., Suwon-si, Gyeonggi-do (KR)

(72) Inventors: Jeheon Park, Hwaseong-si (KR); Ki-Won Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/309,275

(22) PCT Filed: Mar. 28, 2017

(86) PCT No.: PCT/KR2017/003341
§ 371 (c)(1),
(2) Date: Dec. 12, 2018

(87) PCT Pub. No.: WO2017/222152
PCT Pub. Date: Dec. 28, 2017

(65) Prior Publication Data
US 2019/0333494 A1 Oct. 31, 2019

(30) Foreign Application Priority Data

Jun. 24, 2016 (KR) .......................... 10-2016-0079189

(51) Int. Cl.
*G10K 11/178* (2006.01)
*H04R 1/40* (2006.01)
(Continued)

(52) U.S. Cl.
CPC .. *G10K 11/17823* (2018.01); *G10K 11/17853* (2018.01); *G10K 11/17883* (2018.01);
(Continued)

(58) Field of Classification Search
CPC ....... G10K 11/17823; G10K 11/17853; G10K 11/17883; G10K 2210/1281;
(Continued)

(56) References Cited

U.S. PATENT DOCUMENTS

| 7,035,796 B1 | 4/2006 | Zhang et al. |
| 2005/0207585 A1 | 9/2005 | Christoph |

(Continued)

FOREIGN PATENT DOCUMENTS

| KR | 10-2016-0001964 A | 1/2016 |
| KR | 10-2016-0058471 A | 5/2016 |

OTHER PUBLICATIONS

Extended European Search Report dated May 6, 2019, issued in European Application No. 17815566.9.

*Primary Examiner* — William A Jerez Lora
(74) *Attorney, Agent, or Firm* — Jefferson IP Law, LLP

(57) ABSTRACT

Various embodiments of the present invention relate to an electronic device and method for cancelling (or suppressing) a noise of an audio signal of an unmanned aerial vehicle, the electronic device comprising: a movement module comprising a motor; an audio module comprising a first noise suppression module; a memory module for storing control data corresponding to driving data (round per minute RPM) of the motor; and a processor functionally coupled to the audio module, the movement module and the memory module, wherein the processor sets control data according to the driving data of the motor, and applies the set control data to the audio module so that the first noise suppression module suppresses or cancels a noise in an audio signal inputted to the audio module based on the control data. Other embodiments are also applicable.

16 Claims, 20 Drawing Sheets

(51) Int. Cl.
  *H04R 3/00*     (2006.01)
  *H04R 29/00*    (2006.01)
  *H04L 29/08*    (2006.01)

(52) U.S. Cl.
  CPC ............ *H04R 1/406* (2013.01); *H04R 3/005* (2013.01); *H04R 29/005* (2013.01); *G10K 2210/1281* (2013.01); *G10K 2210/3028* (2013.01); *H04L 67/10* (2013.01)

(58) Field of Classification Search
  CPC ............ G10K 2210/3028; H04R 1/406; H04R 3/005; H04R 29/005; H04L 67/10
  USPC ............ 381/71.1, 71.3, 71.8, 94.1, 124
  See application file for complete search history.

(56) References Cited

U.S. PATENT DOCUMENTS

| | | |
|---|---|---|
| 2008/0071540 A1 | 3/2008 | Nakano et al. |
| 2010/0098265 A1 | 4/2010 | Pan et al. |
| 2013/0185065 A1 | 7/2013 | Tzirkel-Hancock et al. |
| 2013/0260692 A1* | 10/2013 | Hera ................... H04M 1/6083 455/63.1 |
| 2015/0314870 A1 | 11/2015 | Davies |
| 2015/0379992 A1 | 12/2015 | Lee et al. |
| 2016/0019904 A1 | 1/2016 | Charette et al. |
| 2016/0063987 A1 | 3/2016 | Xu et al. |
| 2016/0086621 A1 | 3/2016 | Hearing et al. |
| 2016/0139595 A1 | 5/2016 | Yang et al. |
| 2017/0178618 A1* | 6/2017 | Beckman ............. G10K 11/178 |

* cited by examiner

ELECTRONIC APPARATUS AND METHOD FOR OPERATING SAME

TECHNICAL FIELD

Various embodiments of the present invention relate to an electronic device and its operating method, and relate to an apparatus and a method for cancelling (or suppressing) a noise of an audio signal of an unmanned aerial vehicle.

BACKGROUND ART

In recent, development and interest in a mobile device which may be moved by a power device are increasing. The mobile device may include a camera and a microphone, and may be a mobile recording device for storing images and audio while moving. The mobile recording device may be an unmanned aerial vehicle (UAV), for example, a drone. If such a mobile recording device performs a recording and/or sound recording operation, a noise generated by the power device (e.g., noises generated from a motor and a propeller) may flow into an input device (e.g., a microphone, etc.). This may deteriorate a recording quality of the mobile recording device. Hence, the mobile recording device may analyze a signal inputted through the microphone to cancel the input noise, and cancel the noise by reflecting analysis results.

DISCLOSURE OF INVENTION

Technical Problem

Meanwhile, a mobile recording device (e.g., UAV) may move fast and change its direction freely. Thus, changes of a noise occurring in a power device may be severe according to speed and direction changes of the mobile recording device. In this case, the mobile recording device may have difficulty in analyzing the noise changes and canceling the noise in real time by reflecting analysis results.

According to various embodiments of the present invention, an apparatus and a method for recording while cancelling a noise included in an audio signal (hereafter, referred to as an input audio signal) inputted through an input device based on a power control value (e.g., round per minute (RPM)) of a mobile recording device may be provided.

According to various embodiments of the present invention, a mobile recording device may provide an apparatus and a method for including a plurality of audio input devices, controlling on/off of the audio input devices based on a power control value applied to a power unit if performing a recording function, and recording while cancelling a noise in an audio signal received through an input device which is turned on.

According to various embodiments of the present invention, an apparatus and a method for recording while canceling a noise in an input audio signal based on a power control value and/or input audio signal analysis of a mobile recording device may be provided.

According to various embodiments of the present invention, an apparatus and a method for recording while canceling a noise (e.g., propeller noise) in an input audio signal based on of a power control value of a power device (e.g., a motor) if a mobile recording device (e.g., a drone) performs a recording function may be provided.

Solution to Problem

According to various embodiments of the present invention, an electronic device may include a movement module including a motor; an audio module including a first noise suppression module; a memory module for storing control data corresponding to driving data (round per minute RPM) of the motor; and a processor functionally coupled to the audio module, the movement module and the memory module, wherein the processor may set control data according to the driving data of the motor, and apply the set control data to the audio module so that the first noise suppression module suppresses or cancels a noise in an audio signal inputted to the audio module based on the control data.

According to various embodiments of the present invention, an operating method of an electronic device may include receiving an audio signal; and first audio controlling for canceling a noise in the received audio signal, wherein the first audio controlling may include identifying driving data (RPM) of at least one motor of the electronic device; setting control data for suppressing or canceling a noise generated by at least one motor which rotates in response to the identified RPM; and suppressing or canceling a noise in the received audio signal based on the set control data.

Advantageous Effects of Invention

According to various embodiments, a mobile recording device may cancel a noise generated by a power device based on a power control value applied to the power device. According to various embodiments of the present invention, the mobile recording device may be a drone. If the drone drives a motor and a propeller for flight and direction change, noise suppression performance may not be complete in cancelling the noise by using only an input signal (e.g., analyzing the input signal) of a microphone to cancel the noise generated by driving the motor and the propeller. According to various embodiments of the present invention, the drone may cancel the noise in the input audio signal by pre-storing parameters of noise canceling solution according to an round per minute (RPM) of the motor and applying parameters according to RPM change to the input audio signal in real time if the drone moves. Various embodiments of the present invention may perform a recording function while adequately canceling the noise which changes in real time, if driving the drone through voice recognition, recording sound, and capturing a video.

BEST MODE FOR CARRYING OUT THE INVENTION

Figure 1:
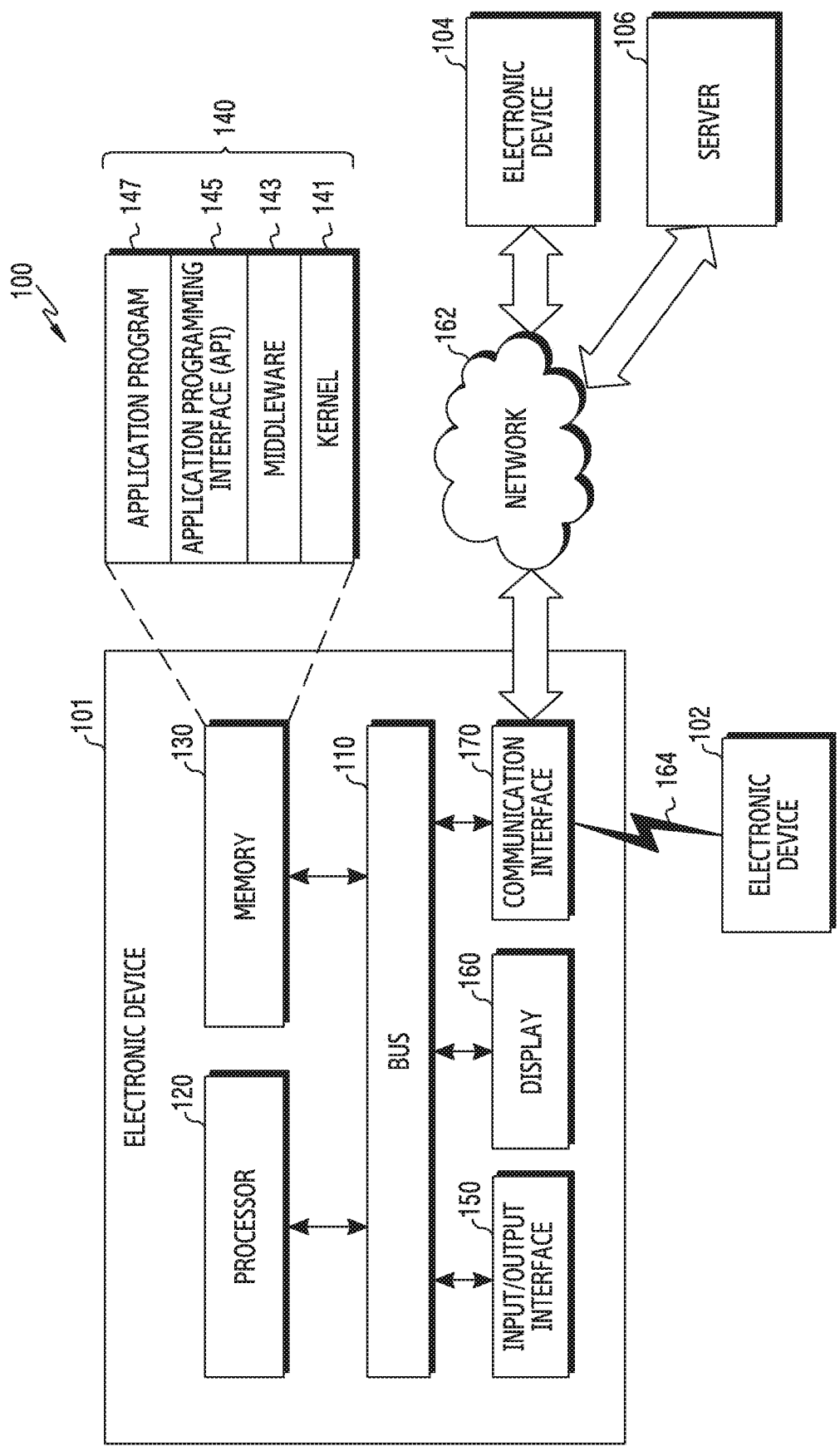
FIG. 1 illustrates a block diagram of a network environment system according to various embodiments.

Various embodiments of the present disclosure are described in greater detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure. The terms used herein are defined in consideration of functions of the present disclosure and may vary depending on a user's or an operator's intention and usage. Therefore, the terms used herein should be understood based on the descriptions made herein. It is to be understood that the singular forms "a," "an," and "the" also include plural referents unless the context clearly dictates otherwise. In the present disclosure, an expression such as "A or B," "at least one of A and B" or "one or more of A and B" may include all possible combinations of the listed items. Expressions such as "first," "second," "primarily," or "secondary," as used herein, may represent various elements regardless of order and/or importance, and do not limit the corresponding elements. The expressions may be used for distinguishing one element from another element. When it is described that an element (such as a first element) is operatively or communicatively "coupled to" or "connected to" another element (such as a second element), the element may be directly connected to the other element or may be connected through another element (such as a third element).

The expression "configured (or set) to", as used in the present disclosure, may be used interchangeably with, for example, "suitable for," "having the capacity to," "designed to," "adapted to," "made to," or "capable of", according to the situation. The term "configured (or set) to" does not only refer to "specifically designed to" in hardware. Alternatively, in some situations, the expression "apparatus configured to" may refer to a situation in which the apparatus "may" operate together with another apparatus or component. The phrase "a processor configured (or set) to perform A, B, and C" may be a dedicated processor, a general-purpose processor (such as a central processing (CPU) or an application processor (AP)) that may perform a corresponding operation by executing at least one software program stored in a dedicated processor (such as an embedded processor) for performing a corresponding operation or in a memory device.

An electronic device, according to an embodiment of the present disclosure, may be for example, at least one of a smart phone, a tablet PC, a mobile phone, a video phone, an e-book reader, a desktop PC, a laptop PC, a notebook computer, a workstation, a server, a PDA, a portable multimedia player (PMP), an MPEG 3 (MP3) player, medical equipment, a camera, and a wearable device, and the like, but is not limited thereto. The wearable device may include at least one of an accessory type (e.g., a watch, a ring, a bracelet, an ankle bracelet, a necklace, eyeglasses, a contact lens, or a head-mounted-device (HMD)), a fabric or clothing embedded type (e.g., electronic garments), a body attachable type (e.g., a skin pad or a tattoo), and an implantable circuit, and the like, but is not limited thereto. The electronic device may be at least one of, for example, a television, a digital versatile disc (DVD) player, an audio device, a refrigerator, an air-conditioner, a cleaner, an oven, a microwave oven, a washing machine, an air cleaner, a set-top box, a home automation control panel, a security control panel, a media box, an electronic dictionary, an electronic key, a camcorder, and an electronic frame, and the like, but is not limited thereto.

In an embodiment of the present disclosure, the electronic device may be at least one of various medical devices (such as, various portable medical measuring devices (a blood sugar level measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, and an ultrasonic wave device), a navigation device, a global navigation satellite system (GNSS), an event data recorder (EDR), a flight data recorder (FDR), a vehicle infotainment device, electronic equipment for a ship (such as, a navigation device for a ship and a gyro compass), avionics, a security device, a head unit for a vehicle, an industrial or home robot, a drone, an automated teller machine (ATM), a point of sales (POS) device, and an Internet of things (IoT) device (e.g., a light bulb, various sensors, a sprinkler device, a fire alarm, a thermostat, a street light, a toaster, sports equipment, a hot water tank, a heater, and a boiler), and the like, but is not limited thereto. According to an embodiment of the present disclosure, the electronic device may be at least one of a portion of furniture, building/construction or vehicle, an electronic board, an electronic signature receiving device, a projector, and various measuring devices (e.g., water supply, electricity, gas, or electric wave measuring device), and the like, but is not limited thereto. An electronic device may be a flexible electronic device or a combination of two or more of the foregoing various devices. An electronic device is not limited to the foregoing devices, and may be embodied as a newly developed electronic device. The term "user", as used herein, may refer to a person using an electronic device or a device using an electronic device (e.g., an artificial intelligence electronic device).

FIG. 1 is a block diagram of an electronic device in a system (100), according to an embodiment of the present disclosure. The electronic device 101 includes a bus 110, a processor 120, a memory 130, an input/output interface 150, a display 160, and a communication interface 170. The electronic device 101 may be provided without at least one of the components, or may include at least one additional component. The bus 110 may include a circuit for connecting the components 120 through 170 and delivering communication signals (e.g., control messages or data) therebetween. The processor 120 may include one or more of a CPU, an AP, and a communication processor (CP). The processor 120, for example, may perform an operation or data processing with respect to control and/or communication of at least another component of the electronic device 101.

The memory 130 may include a volatile and/or nonvolatile memory. The memory 130, for example, may store commands or data relating to at least another component of the electronic device 101. According to an embodiment of the present disclosure, the memory 130 may store software and/or a program 140. The program 140 includes, for example, a kernel 141, middleware 143, an application programming interface (API) 145, and/or an application program (or applications) 147. At least part of the kernel 141, the middleware 143, or the API 145 may be referred to as an operating system (OS). The kernel 141 may control or manage system resources (e.g., the bus 110, the processor 120, or the memory 130) used for performing operations or functions implemented by the other programs (e.g., the middleware 143, the API 145, or the applications 147). Additionally, the kernel 141 may provide an interface for controlling or managing system resources by accessing an individual component of the electronic device 101 from the middleware 143, the API 145, or the applications 147.

The middleware 143, for example, may serve an intermediary role for exchanging data between the API 145 or the applications 147 and the kernel 141 through communication. Additionally, the middleware 143 may process one or more job requests received from the applications 147, based on their priority. The middleware 143 may assign a priority for using a system resource (e.g., the bus 110, the processor 120, or the memory 130) of the electronic device 101 to at least one of the applications 147, and process the one or more job requests. The API 145, as an interface through which the applications 147 controls a function provided from the kernel 141 or the middleware 143, may include, for example, at least one interface or function (e.g., an instruction) for file control, window control, image processing, or character control. The input/output interface 150, for example, may deliver commands or data input from a user or another external device to other component(s) of the electronic device 101, or output commands or data input from the other component(s) of the electronic device 101 to the user or another external device.

The display 160, for example, may include a liquid crystal display (LCD), a light emitting diode (LED) display, an organic light emitting diode (OLED) display, a microelectromechanical systems (MEMS) display, or an electronic paper display, and the like, but is not limited thereto. The display 160, for example, may display various content (e.g., texts, images, videos, icons, and/or symbols) to the user. The display 160 may include a touch screen, for example, and receive touch, gesture, proximity, or hovering inputs by using an electronic pen or a user's body part. The communication interface 170, for example, may set communications between the electronic device 101 and an external device (e.g., a first external electronic device 102, a second external electronic device 104, or a server 106. The communication interface 170 may communicate with the second external electronic device 104 or the server 106 over a network 162 through wireless communication or wired communication.

The wireless communication, for example, may include cellular communication using at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communication may include, for example, at least one of wireless fidelity (Wi-Fi), light fidelity (Li-Fi), Bluetooth™ Bluetooth™ low energy (BLE), Zigbee, near field communication (NFC), magnetic secure transmission, radio frequency (RF), and body area network (BAN). The wireless communication may include GNSS. The GNSS may include, for example, global positioning system (GPS), global navigation satellite system (GLONASS), Beidou navigation satellite system (Beidou), or Galileo (the European global satellite-based navigation system). Hereafter, the term GPS may be interchangeably used with the term GNSS. The wired communication, for example, may include at least one of universal serial bus (USB), high definition multimedia interface (HDMI), recommended standard 232 (RS-232), power line communications, and plain old telephone service (POTS). The network 162 may include a telecommunications network, for example, at least one of a computer network (e.g., LAN or WAN), the Internet, and a telephone network.

Each of the first and second external electronic devices 102 and 104 may be of the same type or of a different type from that of the electronic device 101. According to an embodiment of the present disclosure, all or part of operations executed in the electronic device 101 may be executed by another electronic device or a plurality of electronic devices (e.g., the electronic device 102 or 104, or the server 106). To perform a function or service automatically or by request, instead of performing the function or the service by the electronic device 101, the electronic device 101 may request at least part of a function relating thereto from the electronic device 102 or 104, or the server 106. The electronic device 102 or 104, or the server 106 may perform the requested function or an additional function and send its result to the electronic device 101. The electronic device 101 may provide the requested function or service by processing the received result. In doing so, for example, cloud computing, distributed computing, or client-server computing techniques may be used.

Figure 2:
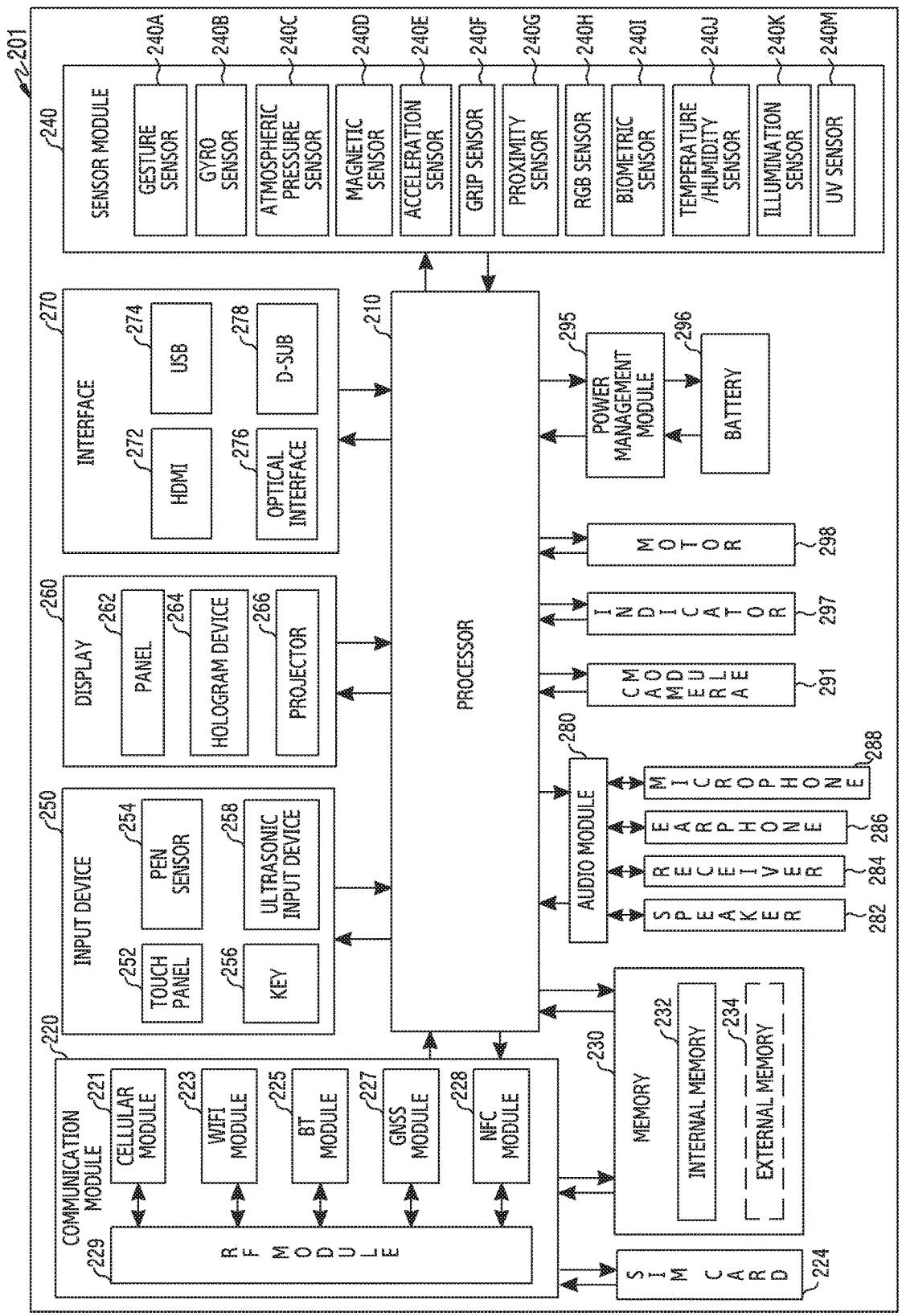
FIG. 2 illustrates a block diagram of an electronic device according to various embodiments.

FIG. 2 is a block diagram of an electronic device, according to an embodiment of the present disclosure. The electronic device 201, for example, may include all or part of the above-described electronic device 101 of FIG. 1. The electronic device 201 includes one or more processors (e.g., an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210, for example, may control a plurality of hardware or software components connected to the processor 210, and also may perform various data processing and operations by executing an OS or an application program. The processor 210 may be implemented with a system on chip (SoC), for example. The processor 210 may further include a graphic processing unit (GPU) and/or an image signal processor. The processor 210 may include at least part (e.g., a cellular module 221) of the components illustrated in FIG. 2. The processor 210 may load commands or data received from at least one other component (e.g., a nonvolatile memory) into a volatile memory, process the commands, and store various data in the nonvolatile memory.

The communication module 220 may have the same or similar configuration as the communication interface 170 of FIG. 1. The communication module 220 may include, such as, the cellular module 221, a Wi-Fi module 223, a Bluetooth™ (BT) module 225, a GNSS module 227, an NFC module 228, and an RF module 229. The cellular module 221, for example, may provide voice call, video call, short message service (SMS), or Internet service through a communication network. The cellular module 221 may identify and authenticate the electronic device 201 in a communication network by using the SIM 224. The cellular module 221 may perform at least part of a function that the processor 210 provides. The cellular module 221 may further include a CP. At least some (e.g., two or more) of the cellular module 221, the Wi-Fi module 223, the BT module 225, the GNSS module 227, and the NFC module 228 may be included in one integrated circuit (IC) or an IC package. The RF module 229, for example, may transmit/receive a communication signal (e.g., an RF signal). The RF module 229, for example, may include a transceiver, a power amp module (PAM), a frequency filter, a low noise amplifier (LNA), or an antenna. At least one of the cellular module 221, the Wi-Fi module 223, the BT module 225, the GNSS module 227, and the NFC module 228 may transmit/receive an RF signal through an additional RF module. The SIM 224, for example, may include a card or an embedded SIM, and also may contain unique identification information (e.g., an integrated circuit card identifier (ICCID)) or subscriber information (e.g., an international mobile subscriber identity (IMSI)).

The memory 230 (e.g., the memory 130) may include at least one of an internal memory 232 or an external memory 234. The internal memory 232 may include at least one of, for example, a volatile memory (e.g., dynamic RAM (DRAM), static RAM (SRAM), or synchronous dynamic RAM (SDRAM)), and a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory, hard drive, and solid state drive (SSD)). The external memory 234 may include flash drive, for example, compact flash (CF), secure digital (SD), micro SD, mini SD, extreme digital (xD), multi-media card (MMC), or memory stick. The external memory 234 may be functionally or physically connected to the electronic device 201 through various interfaces.

The sensor module 240 may, for example, measure physical quantities or detect an operating state of the electronic device 201, and convert the measured or detected information into electrical signals. The sensor module 240 includes at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor). The sensor module 240 may also include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor therein. The electronic device, as part of the processor 210 or individually, may further include a processor configured to control the sensor module 240 and control the sensor module 240 while the processor 210 is sleeping.

The input device 250, for example, may include at least one of a touch panel 252, a (digital) pen sensor 254, a key 256, and an ultrasonic input device 258. The touch panel 252 may use at least one of, for example, capacitive, resistive, infrared, and ultrasonic methods. Additionally, the touch panel 252 may further include a control circuit. The touch panel 252 may further include a tactile layer to provide a tactile response to a user. The (digital) pen sensor 254 may include, for example, part of a touch panel or a sheet for recognition. The key 256 may include, for example, a physical button, a touch key, an optical key, or a keypad. The ultrasonic input device 258 may detect ultrasonic waves from a microphone 288 and check data corresponding to the detected ultrasonic waves.

The display 260 (e.g., the display 160) may include at least one of a panel 262, a hologram device 264, a projector 266, and/or a control circuit for controlling them. The panel 262 may be flexible, transparent, or wearable, for example. The panel 262 and the touch panel 252 may be configured with one or more modules. The panel 262 may include a pressure sensor (or a force sensor) for measuring a pressure of the user touch. The pressure sensor may be integrated with the touch panel 252, or include one or more sensors separately from the touch panel 252. The hologram device 264 may show three-dimensional images in the air by using the interference of light. The projector 266 may display an image by projecting light on a screen. The screen, for example, may be placed inside or outside the electronic device 201. The interface 270, for example, may include an HDMI 272, a USB 274, an optical interface 276, or a D-subminiature (D-sub) 278. The interface 270 may be included in, for example, the communication interface 170 of FIG. 1. Additionally or alternately, the interface 270 may include a mobile high-definition link (MHL) interface, a SD card/MMC interface, or an infrared data association (IrDA) standard interface.

The audio module 280, for example, may convert sounds into electrical signals and convert electrical signals into sounds. At least some components of the audio module 280 may be included in, for example the input/output interface 150 of FIG. 1. The audio module 280 may process sound information input or output through a speaker 282, a receiver 284, an earphone 286, or the microphone 288. The camera module 291, as a device for capturing still images and videos, may include one or more image sensors (e.g., a front sensor or a rear sensor), a lens, an image signal processor (ISP), or a flash (e.g., an LED or a xenon lamp). The power management module 295, for example, may manage the power of the electronic device 201. According to an embodiment of the present disclosure, the power management module 295 may include a power management IC (PMIC), a charger IC, or a battery gauge, for example. The PMIC may have a wired and/or wireless charging method. The wireless charging method may include, for example, a magnetic resonance method, a magnetic induction method, or an electromagnetic method, and may further include an additional circuit for wireless charging, for example, a coil loop, a resonant circuit, or a rectifier circuit. The battery gauge may measure the remaining charge capacity of the battery 296, or a voltage, current, or temperature of the battery 296 during charging. The battery 296 may include, for example, a rechargeable battery and/or a solar battery.

The indicator 297 may display a specific state of the electronic device 201 or part thereof (e.g., the processor 210), for example, a booting state, a message state, or a charging state. The motor 298 may convert electrical signals into a mechanical vibration and generate a vibration or haptic effect. The electronic device 201 may include a mobile TV supporting device (e.g., a GPU) for processing media data according to standards such as digital multimedia broadcasting (DMB), digital video broadcasting (DVB), or MediaFlo™. Each of the above-described components of the electronic device may be configured with at least one component and the name of a corresponding component may vary according to the kind of electronic device. According to an embodiment of the present disclosure, the electronic device 201 may be configured to include at least one of the above-described components or an additional component, or to not include some of the above-described components. Additionally, some of components in an electronic device are configured as one entity, so that functions of previous corresponding components are performed identically.

Figure 3:
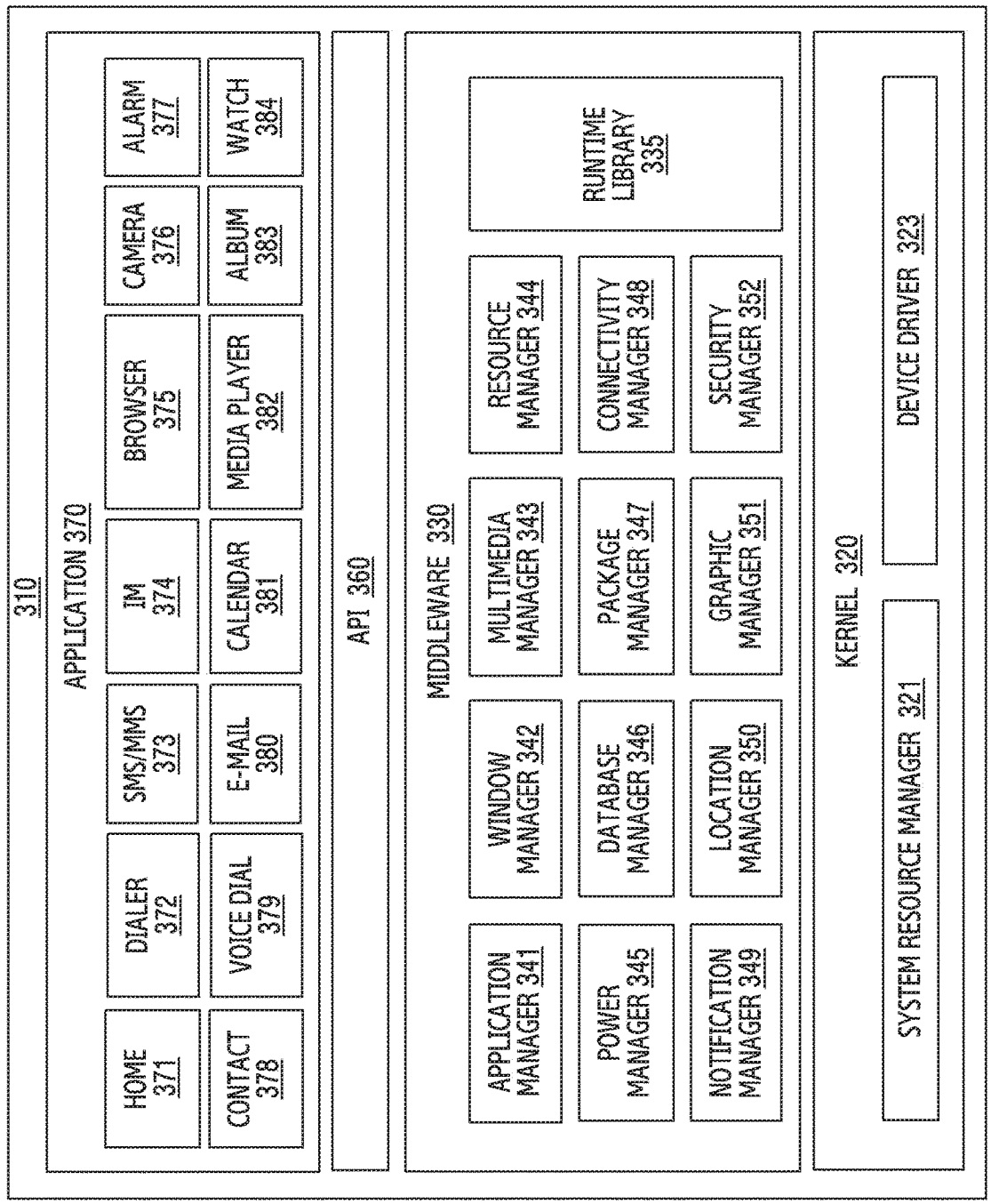
FIG. 3 shows a block diagram of a program module according to various embodiments.

FIG. 3 is a block diagram of a program module, according to an embodiment of the present disclosure. A program module 310 (e.g., the program 140) may include an OS for controlling a resource relating to the electronic device 101 and/or the applications 147 running on the OS. The OS may include, for example, Android™ iOS™, Windows™, Symbian™, Tizen™, or Bada™. Referring to FIG. 3, the program module 310 includes a kernel 320 (e.g., the kernel 141), a middleware 330 (e.g., the middleware 143), an API 360 (e.g., the API 145), and/or an application 370 (e.g., the applications 147). At least part of the program module 310 may be preloaded on an electronic device or may be downloaded from an external electronic device (e.g., the first external electronic device 102, the second external electronic device 104, or the server 106).

The kernel 320 includes, for example, at least one of a system resource manager 321 and/or a device driver 323. The system resource manager 321 may control, allocate, or retrieve a system resource. According to an embodiment of the present disclosure, the system resource manager 321 may include a process management unit, a memory management unit, or a file system management unit. The device driver 323 may include, for example, a display driver, a camera driver, a Bluetooth™ driver, a shared memory driver, a USB driver, a keypad driver, a Wi-Fi driver, an audio driver, or an inter-process communication (IPC) driver. The middleware 330, for example, may provide a function commonly required by the application 370, or may provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a compiler to add a new function through a programming language while the application 370 is running. The runtime library 335 may manage input/output, manage memory, or arithmetic function processing. The application manager 341, for example, may manage the life cycle of the applications 370. The window manager 342 may manage a GUI resource used in a screen. The multimedia manager 343 may recognize a format for playing various media files and encode or decode a media file by using the codec in a corresponding format. The resource manager 344 may manage a source code of the application 3740 or a memory space. The power manager 345 may manage the capacity, temperature, and/or power of the battery, and determine or provide power information for an operation of the electronic device using corresponding information among the capacity, temperature, and/or power of the battery. The power manager 345 may operate together with a basic input/output system (BIOS). The database manager 346 may create, search, or modify a database used in the application 370. The package manager 347 may manage installation or updating of an application distributed in a package file format.

The connectivity manager 348 may manage, for example, a wireless connection. The notification manager 349 may provide an event, such as incoming messages, appointments, and proximity alerts, to the user. The location manager 350 may manage location information of an electronic device. The graphic manager 351 may manage a graphic effect to be provided to the user or a user interface relating thereto. The security manager 352 may provide, for example, system security or user authentication. The middleware 330 may include a telephony manager for managing a voice or video call function of the electronic device, or a middleware module for combining various functions of the above-described components. The middleware 330 may provide a module specialized for each type of OS. The middleware 330 may dynamically delete part of the existing components or add new components. The API 360, as a set of API programming functions, may be provided as another configuration according to the OS. For example, Android or iOS may provide one API set for each platform, and Tizen may provide two or more API sets for each platform.

The application 370 includes at least one of a home 371, a dialer 372, an SMS/multimedia messaging system (MMS) 373, an instant message (IM) 374, a browser 375, a camera 376, an alarm 377, a contact 378, a voice dial 379, an e-mail 380, a calendar 381, a media player 382, an album 383, a clock 384. Additionally, the application 370 may include health care (e.g., measure an exercise amount or blood sugar level), or environmental information (e.g., air pressure, humidity, or temperature information) application. The application 370 may include an information exchange application for supporting information exchange between the electronic device and an external electronic device. The information exchange application may include, for example, a notification relay application for relaying specific information to the external device or a device management application for managing the external electronic device. The notification relay application may relay notification information from another application of the electronic device to an external electronic device, or receive and forward notification information from an external electronic device to the user. The device management application, for example, may install, delete, or update a function (e.g., turn-on/turn off of the external electronic device itself (or some components) or display brightness (or resolution) adjustment) of an external electronic device communicating with the electronic device, or an application operating in the external electronic device. The application 370 may include a specific application (e.g., a health care application of a mobile medical device) according to a property of the external electronic device. The application 370 may include an application received from an external electronic device. At least part of the program module 310 may be implemented (e.g., executed) with software, firmware, hardware (e.g., the processor 210), or a combination of at least two of them, and include a module, a program, a routine, a set of instructions, or a process for executing one or more functions.

The term "module", as used herein, may refer, for example, to a unit including hardware, software, and firmware, or any suitable combination thereof. The term "module" can be interchangeably used with terms such as "unit", "logic", "logical block", "component", "circuit", and the like. A module can be a minimum unit of an integral component or can be a part thereof. A module can be a minimum unit for performing one or more functions or may be a part thereof. A module can be mechanically or electrically implemented. For example, a module, according to an embodiment of the present disclosure, can include, for example, and without limitation, at least one of a dedicated processor, a CPU, an Application-Specific Integrated Circuit (ASIC) chip, a Field-Programmable Gate Arrays (FPGAs), and a programmable-logic device, which are known or will be developed and which perform certain operations.

At least some parts of a device (e.g., modules or functions thereof) or a method (e.g., operations), based on embodiments of the present disclosure, can be implemented with an instruction stored in a non-transitory computer-readable storage medium (e.g., the memory 130) as a program module. When the instruction is executed by a processor (e.g., the processor 120), the processor can perform a function corresponding to the instruction. The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter.

The module or program module can further include at least one or more components among the aforementioned components, or can omit some of them, or can further include additional other components. Operations performed by a module, program module, or other components of the various embodiments of the present disclosure can be executed in a sequential, parallel, repetitive, or heuristic manner. In addition, some of the operations can be executed in a different order or may be omitted, or other operations may be added.

Figure 4:
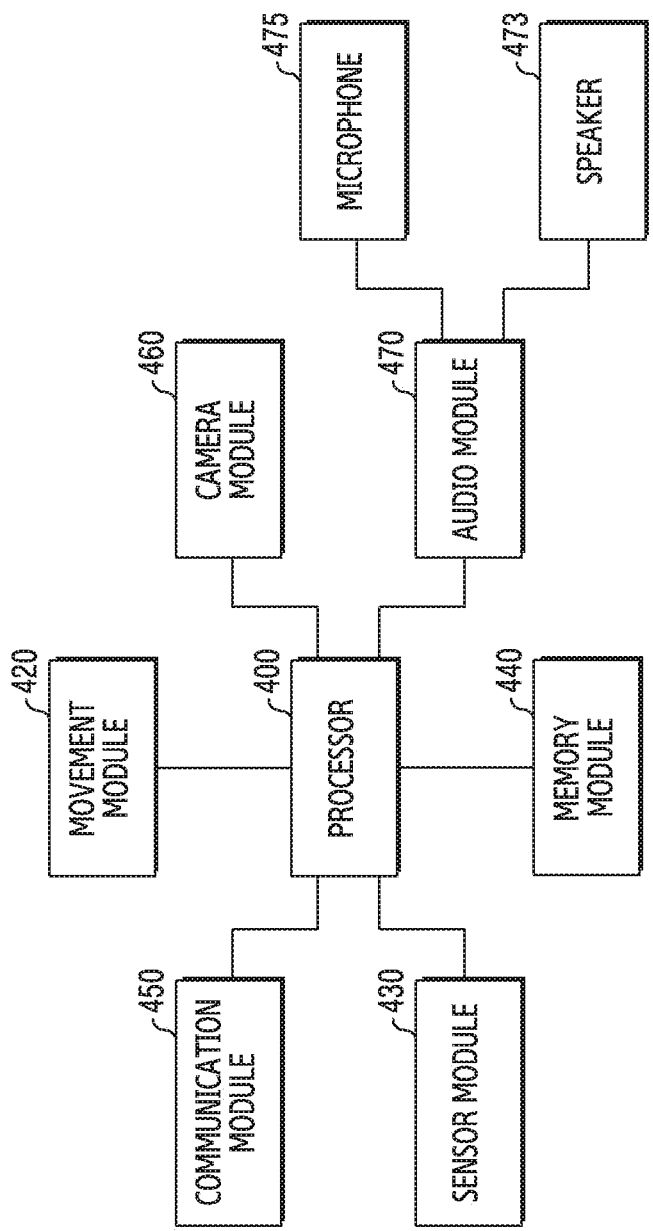
FIG. 4 is a diagram illustrating a configuration of a mobile recording device according to an embodiment of the present invention.

FIG. 4 is a diagram illustrating a configuration of a mobile recording device according to an embodiment of the present invention. Referring to FIG. 4, according to an embodiment, the mobile recording device may include whole or part of a processor 400, a movement module 420, a sensor module 430, a memory module 440, a communication module 450, a camera module 460, and audio modules 470.

The processor 400 may execute operations or data processing according to controlling at least one other components of the mobile recording device and/or application execution. The processor 400 may include an application processor for executing an application and a movement control module for controlling movement. The application processor may perform interworking with a remote control device (e.g., an electronic device) through an application platform, communication connectivity, and operation change according to a user application. The movement control module may control a movement speed and a direction change of the mobile recording device.

The processor 400 according to various embodiments of the present invention may perform a function for cancelling or suppressing a noise included in an audio signal inputted to the mobile recording device if executing an application (e.g., video recording) which records audio. The noise may be a noise of wind caused by the movement of the mobile recording device or an ambient noise, and a noise (e.g., motor rotation sound, propeller rotation sound) according to power to move the mobile recording device. If the mobile recording device moves, the processor 400 may cancel or suppress a noise received from a microphone and/or a noise caused by the power device of the mobile recording device. Hereafter, it is described that the noise is cancelled for the sake of explanations. In other words, the noise cancelling indicates removing or suppressing the noise.

The movement module 420 may move the mobile recording device under the control of the processor 400. If the mobile recording device is a drone, the movement module 420 may include a plurality of propellers and motors which generate rotation power of the propellers.

The sensor module 430 may measure a physical amount or detect an operation state of the mobile recording device, and thus convert the measured or detected information to an electric signal. The sensor module 430 may include all or part of an acceleration sensor, a gyro sensor, a barometer, a terrestrial magnetism sensor or a compass sensor, an ultrasonic sensor, an optical flow for detecting movement using images, a temperature-humidity sensor, an illuminance sensor, a UV sensor, and a gesture sensor.

The sensor module 430 according to various embodiment of the present invention may include sensors for controlling an attitude of the mobile recording device. The sensors for calculating the attitude of the mobile recording device may be the gyro sensor and the acceleration sensor. To calculate an azimuth and to prevent drift of the gyro sensor, the sensor module 430 may use an output of the terrestrial magnetism sensor.

The memory module 440 may include a volatile memory and/or a non-volatile memory. The memory module 440 may store commands or data relating to at least one other component of the mobile recording device. The memory module 440 may store software and/or program. The program may include a kernel, a middleware, an API, and/or an application program (or "application"). At least part of the kernel, the middle, or the API may be referred to as an operating system (OS).

According to various embodiment of the present invention, the memory module 440 may store control data for cancelling a noise occurred by power control values of the mobile recording device. For example, the mobile recording device may measure the noise occurred by the power control values, and store control data for cancelling a noise level and/or frequency according to the measured noise characteristics. For example, if the mobile recording device is a drone, the memory module 440 may measure and analyze in advance the noise occurred by the mobile recording device according to driving data of motors, and store control data (e.g., a lookup table) for canceling the noise occurred by each motor driving data based on analysis results. Also, the control data may further include control data for controlling the operation of the microphone according to movement direction and/or speed of the mobile recording device.

According to an embodiment, if the mobile recording device is moving (flying), the mobile recording device (e.g., the processor 400) may measure a noise received from at least one microphone, and also obtain motor driving data for controlling the movement of the mobile recording device. The mobile recording device may cancel the noise using control data corresponding to the measured noise and the motor driving data.

The communication module 450 may include at least one of a wireless communication module and a wired communication module. The wireless communication module may include a cellular communication module and a short-range communication module. The communication module 450 may include a GPS module.

The cellular communication module may use at least one of LTE, LTE-A, CDMA, WCDMA, UMTS, WiBro, or GSM.

The short-range communication module may include at least one of Wi-Fi, Bluetooth, NFC, or GNSS or GPS. The GNSS may include, for example, at least one of GPS, global navigation satellite system (GLONASS), Beidou navigation satellite system (hereafter, "Beidou"), or Galileo, the European global satellite-based navigation system, according to its use area or bandwidth. "GNSS" of the communication module 450 may be interchangeably used with "GPS".

The wired communication module may include, for example, at least one of USB, HDMI, and RS-232.

The GPS module according to various embodiments of the present invention may output position information such as longitude, latitude, altitude, GPS speed, and heading (GPS heading) information of the mobile recording device during the movement of the mobile recording device. The position information may calculate a position by measuring accurate time and distance using the GPS module. The GPS module may acquire not only the longitude, the latitude, and the altitude but also three-dimensional speed information and the accurate time.

The communication module 450 may transmit information for identifying a real-time movement state of the mobile recording device. The communication module 450 according to various embodiments of the present invention may receive photographing information from an electronic device. The communication module 450 in an embodiment may transmit images taken by the mobile recording device and the photographing information to a remote control device (e.g., the electronic device 101 of FIG. 1 or the electronic device 201 of FIG. 2).

The camera module 460 may capture a subject in a photographing mode. The camera module 460 may include a lens, an image sensor, an image signal processor, and a camera controller.

The lens may perform a function for focusing using straightness and refraction of a light and a function for magnifying/reducing (zoom in/out) a subject. The image sensor may include a pixel array, and a portion for control (e.g., row control) and readout of the pixel array. The pixel array may include a micro lens array, a color filter array, and a light-sensitive element arrays. The image sensor may be controlled using a global shutter scheme or a rolling shutter scheme. Analog pixel signals readout from the pixel array of the image sensor may be converted to digital data through an analog to digital converter (ADC). The converted digital data may be outputted to the processor 400 through an external interface such as mobile industry processor interface (MIPI) via an internal digital block of the image sensor. The camera controller may include a lens controller for controlling the lens, and a direction controller for controlling a camera direction (up, down, left, and/or right directions). The lens controller may perform operations such as zoom, focus, iris by controlling driving of the lens. The direction controller may control an angle for vertical and horizontal directions of the camera so as to face the subject.

The audio module 470 may be connected with a microphone 475 and a speaker 473. The microphone 475 may include one or at least two microphones, and may be mounted at a position where less noise generated by the driving of the mobile recording device occurs (or flows). For example, the microphone 475 may be mounted at a position where less noise generated by the power (e.g., the motor and the propeller) of the mobile recording device occurs (or flows). For example, if the mobile recording device is a drone, the microphone 475 may be positioned at a bottom (e.g., near the camera 460) of a main body of the mobile recording device. The audio module 470 may be configured in number corresponding to the number of the microphones. The audio module 470 may process an audio signal received from the corresponding microphone 475 as audio data and output to the processor 400, and convert audio data generating at the processor 400 to an audible sound and output through the speaker 473.

According to an embodiment, the audio module 470 may include a noise suppression module. The noise suppression module may cancel a noise included in the audio signal received through the microphone 475. For example, the noise suppression module may cancel the noise (e.g., a motor driving sound, a propeller rotation sound, a noise of wind according to movement of the mobile recording device, etc.) included in the received audio signal by controlling a gain and/or a frequency of the audio signal according to the control data provided from the processor 400.

According to an embodiment, the audio module 470 may control ON/OFF of the microphone 475 under the control of the processor 400. For example, the audio module 470 may turn off the microphone 475 (e.g., a microphone disposed close to a motor of high motor RPM) based on the movement direction of the mobile recording device under the control of the processor 400. For example, the audio module 470 may turn off the microphone 475 disposed close to the motor (e.g., if a round per minute (RPM) of the motor exceeds a set RPM, that is, if a movement speed of the mobile recording device exceeds a set speed) based on the movement direction of the mobile recording device and the RPM of the motor under the control of the processor 400.

Figure 5:
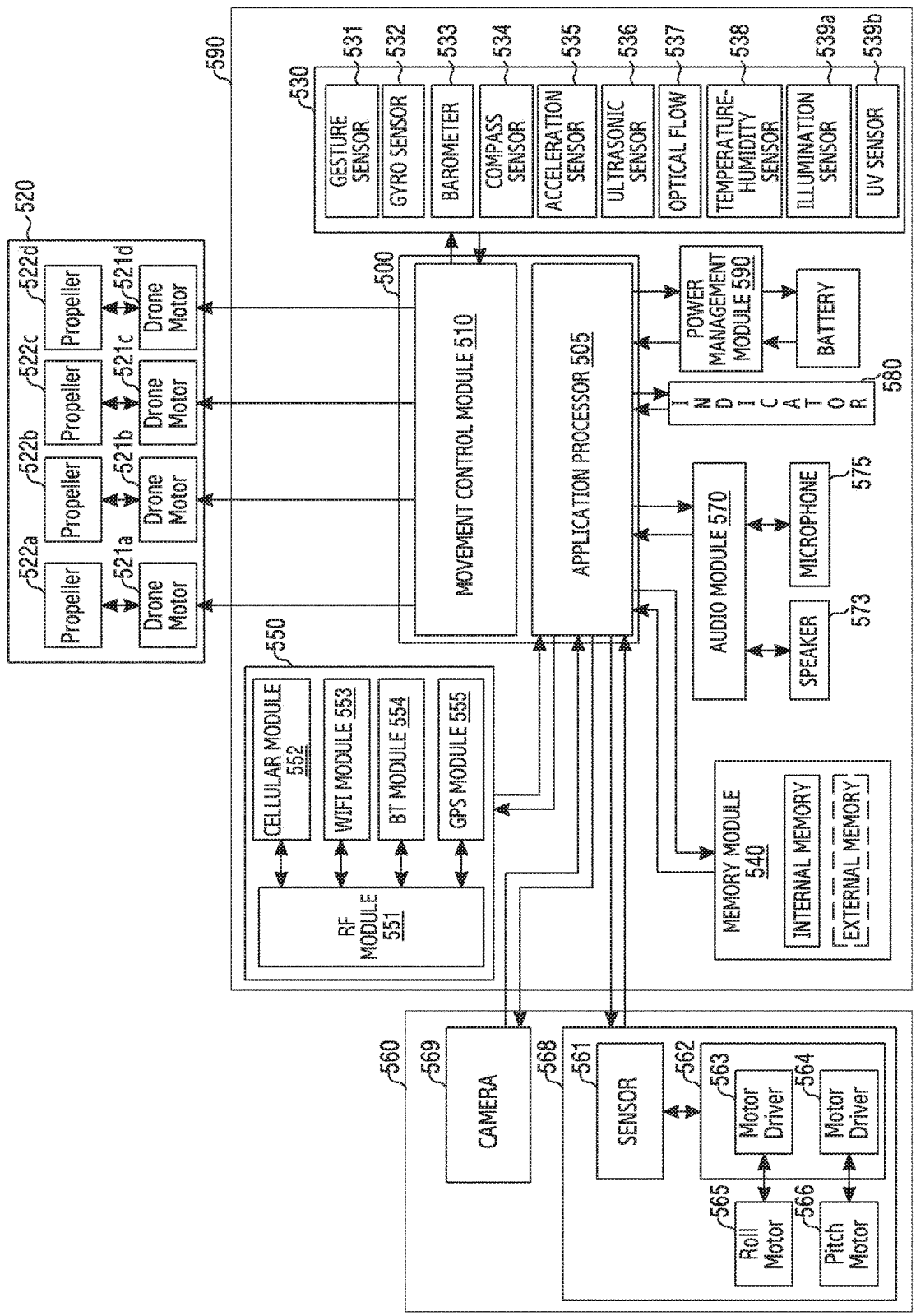
FIG. 5 is a diagram illustrating a configuration example of a mobile recording device according to various embodiments of the present invention.

FIG. 5 is a diagram illustrating a configuration example of a mobile recording device according to various embodiments of the present invention. In FIG. 5, the mobile recording device may be a drone, a quadcopter by way example. In the following explanations, the mobile recording device is the drone by way of example.

Referring to FIG. 5, a processor 500 may include an application processor 505 and a movement control module 510. The processor 500 may be the processor 400 of FIG. 4.

The application processor 505 may perform interworking with a remote control devices (e.g., an electronic device), communication connectivity, and operation changing according to a user application. The application processor 505 according to various embodiments of the present invention may measure a noise included in an audio signal received through an audio module 570 during movement of the drone. The application processor 505 may generate control data for controlling to cancel the noise based on a motor RPM according to the movement of the drone. The application processor 505 may generate control data for turning on/off a microphone based on a movement direction and/or speed of the drone.

The movement control module 510 may generate motor driving data for controlling the movement of the drone by using position and attitude information of the drone. The movement control module 510 may output the motor driving data for controlling roll, pitch, yaw, throttle, and so on of the mobile recording device (drone) according to the obtained position and attitude information. The movement control module 510 may generate the motor driving data corresponding to the number of propellers.

A movement module 520 may be the movement module 420 of FIG. 4. If the drone the quadcopter, the movement module 520 may include a first motor 521a—a fourth motor 521d and a first propeller 522a—a fourth propeller 522d. The first motor 521a—the fourth motor 521d may control rotations of the first propeller 522a—the fourth propeller 522d respectively according to first motor driving data—fourth motor driving data.

The movement control module 510 may generate the first motor driving data—the fourth motor driving data to control the first motor 521a—the fourth motor 521d according to a movement control command, and the first motor driving data—the fourth motor driving data may be data for controlling RPMs of the corresponding first motor 521a—fourth motor 521d. The first motor driving data—the fourth motor driving data may be applied to the first motor 521a—the fourth motor 521d respectively and used to control rotation powers of the first propeller 522a—the fourth propeller 522d.

A sensor module 530 may be the sensor module 430 of FIG. 4. The sensor module 530 includes some or all of a gesture sensor 531 for detecting a motion and/or a gesture of a subject, a gyro sensor 532 for measuring an angular velocity of the flying drone, a barometer 533 for measuring a pressure change and/or an atmospheric pressure of the air, a terrestrial magnetism sensor (compass sensor) 534 for measuring terrestrial magnetism, an acceleration sensor 535 for measuring acceleration of the flying drone, an ultrasonic sensor 536 for measuring a distance by outputting ultrasonic waves and detecting a signal reflected by an object, an optical flow 537 for calculating a position by recognizing geographical features or patterns on the ground using a camera module, a temperature-humidity sensor 538 for measuring temperature and humidity, an illuminance sensor 539a for measuring illuminance, and a UV sensor 539b for measuring UV light.

The sensor module 530 according to various embodiments of the present invention may calculate an attitude of the drone. The sensor for calculate the attitude of the drone may be the gyro sensor 532 and the acceleration sensor 535. The sensor module 530 may further combine the output of the terrestrial magnetism sensor 534 in order to calculate an azimuth and to prevent drift of the gyro sensor 532.

A memory module 540 may include an internal memory and an external memory. The memory module 540 may be the memory module 440 of FIG. 4. The memory module 540 may store control data (noise suppressing data) for analyzing in advance noise characteristics according to the motor driving of the drone, and cancelling a noise level and/or a frequency according to the analyzed noise characteristics. For example, the memory module 540 may measure and analyze an ambient noise (e.g., a noise occurred by rotations of the propeller and/or the motor) occurring according to the RPM of the motor, and store a compensation value (hereafter, control data) for canceling the measured ambient noise based on analyzed results. The control data may be measured and set per RPM, and the memory module 540 may store the control data per RPM in the form of a lookup table. Also, the memory module 540 may further store control data (hereafter, microphone driving control data) for controlling the operation of the microphone according to the movement direction and/or speed of the drone. For example, the microphone driving control data may become data for controlling on/off of the microphone by determining whether the movement speed of the mobile recording device exceeds a set reference speed (e.g., exceeds a set RPM).

The communication module 550 may be the communication module 450 of FIG. 4. The communication module 550 may include at least one of a wireless communication module and a wired communication module. The communication module 550 may include an RF module 551, a cellular module 552, a WiFi module 553, a BT module 554, and a GPS module 555.

The communication module 550 according to various embodiments of the present invention may receive photographing information transmitted from an electronic device. The communication module 550 in an embodiment may transmit images captured by the drone and the photographing information to the electronic device.

The GPS module 555 according to various embodiments of the present invention may output position information such as longitude, latitude, altitude, GPS speed, and heading information (GPS heading) during the movement of the drone. The position information may be calculated by measuring accurate time and distance using the GPS module 555. The GPS module 555 may acquire not only the longitude, the latitude, and the altitude but also three-dimensional speed information and the accurate time.

The drone according to an embodiment may transmit information for identifying a real-time movement state of the drone to the electronic device through the communication module 550.

A camera module 560 may include a camera 569 and a gimbal 568. The gimbal 568 may include a gimbal controller 562, a sensor 561, motor drivers 563 and 564, and motors 565 and 566. The camera module 560 may be the camera module 460 of FIG. 4.

The camera 569 may perform a photographing operation in a photographing mode. The camera module 560 may include a lens, an image sensor, an image signal processor, and a camera controller. The camera controller may control composition and/or a camera angle (photographing angle) of a subject by adjusting vertical and horizontal angles of the camera lens based on composition information and/or camera control information outputted from the application processor 505. The camera 569 may be affected by the movement of the drone.

The gimbal 568 may stably take an image by maintaining a specific angle of the camera 569 regardless of the movement of the drone. As for operations of the gimbal 568, the sensor 561 may include a gyro sensor and an acceleration sensor. The gimbal controller 562 may recognize the movement of the drone by analyzing a measurement value of the sensor 561 including the gyro sensor and the acceleration sensor. The gimbal controller 562 may generate compensation data according to the movement of the drone. The compensation data may be data for controlling at least part of pitch and roll of the camera module 560. For example, the gimbal 568 may send roll compensation data to the motor driver 563, and the motor driver 563 may convert the roll compensation data to a motor driving signal and forward to the roll motor 565. For example, the gimbal 568 may send pitch compensation data to the motor driver 564, and the motor driver 564 may convert the pitch compensation data to a motor driving signal and forward to the pitch motor 566. The roll motor 565 and the pitch motor 566 may correct the roll and the pitch of the camera module 560 according to the movement of the drone. The camera 569 may stabilize the camera 569 in a right state by offsetting the rotation (e.g., the pitch and the roll) of the drone (e.g., a multicopter) by means of the gimbal 568.

The audio module 570 may generate audio data by processing an audio signal received from the microphone 575. The audio module 570 may process the audio data as an audio signal and thus play it through the speaker 573. According to various embodiments of the present invention, the audio module 570 may include a noise suppression module for cancelling a noise occurring in the movement of the drone.

According to an embodiment, the processor 500 may access and forward to the audio module 570 the control data corresponding to the motor driving data (e.g., RPM) of the drone in the memory module 540. The audio module 570 may cancel the noise in the audio signal inputted from the microphone 575 based on the control data. The noise in the audio signal inputted from the microphone 575 may become a noise according to the motor and propeller rotations of the drone.

According to an embodiment, the processor 500 may analyze whether the RPM of the motor exceeds a set reference value if the drone moves. For example, the reference value may be set to a motor RPM if a propeller noise level which rotates based on the motor RPM exceeds a set noise level. If the analyzed motor RPM value exceeds the reference value, the processor 500 may generate data for turning off the microphone mounted at a corresponding motor position or at a position close to the motor.

Figure 7:
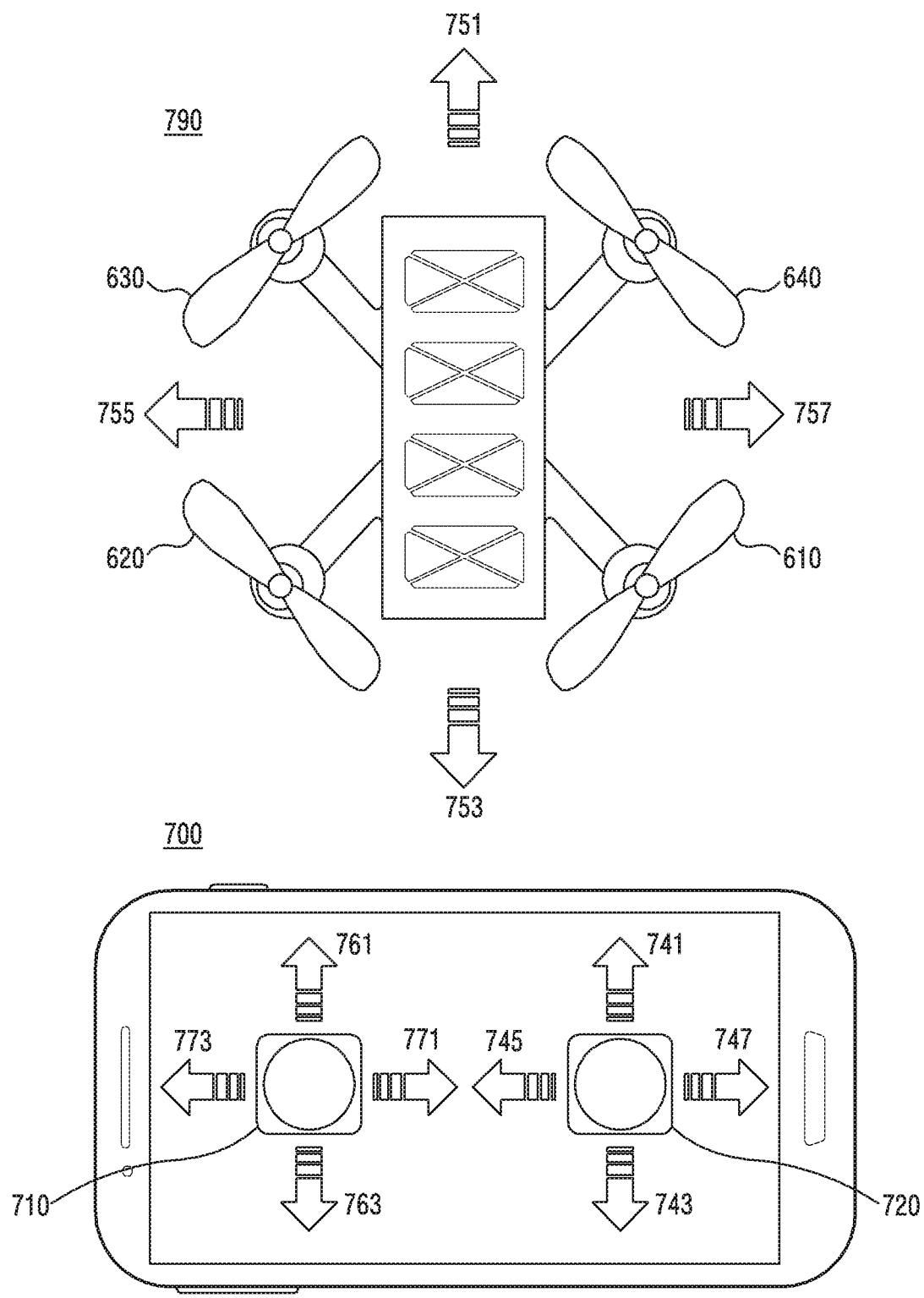
FIG. 7 is a diagram for illustrating operations for controlling a movement of a drone using an electronic device.

According to an embodiment, the drone may be controlled by a remote control device 700 (e.g., a smart phone) of FIG. 7. The processor 500 may control the movement (forward/backward, left/right movement, ascend/descend, direction change, etc.) of the drone according to a control command transmitted from the remote control device. The processor 500 may predict an RPM change of the motor by analyzing the control command transmitted from the remote control device. If the predicted motor RPM exceeds the set reference value, the processor 500 may generate data for turning off the microphone mounted at a corresponding motor position or at a position close to the motor.

In addition, the processor 500 may access and forward to the audio module 570 the control data corresponding to the motor driving data of the drone in the memory module 540. The processor 500 or the audio module 570 may turn on or off the microphone of the corresponding position based on the microphone driving data. The audio module 570 may cancel the noise included in the audio signal inputted from the microphone 575 based on the control data. The noise in the audio signal inputted from the microphone 575 may become the noise according to the motor and propeller rotations of the drone.

FIG. 6A-FIG. 6D are diagrams for illustrating a structure and driving operations of a drone.

Figure 6A:
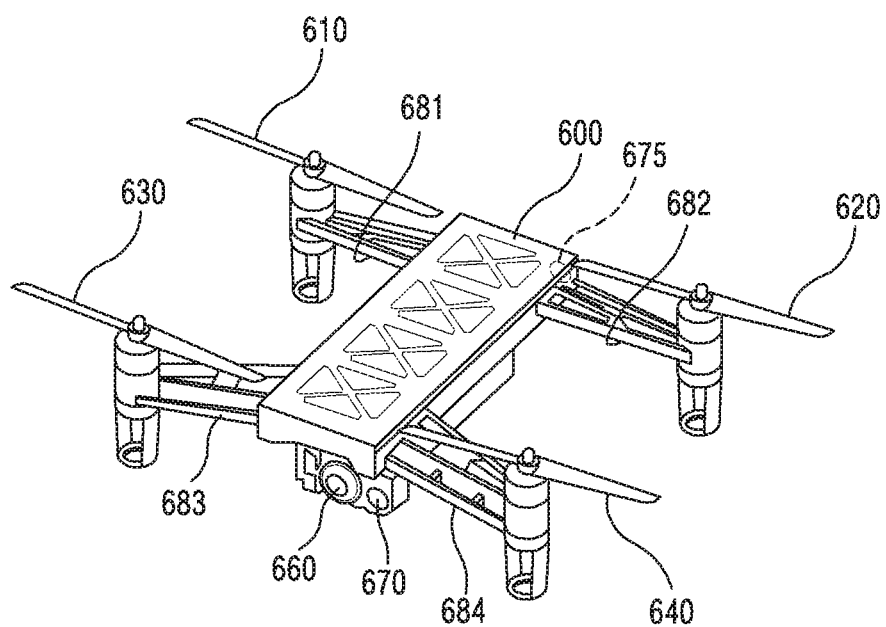
FIG. 6A-FIG. 6D are diagrams for illustrating a structure and a driving operation of a drone.

FIG. 6A depicts that the drone is a quadcopter by way of example. The drone may include a main board 600 having the configuration of FIG. 5, a gimbal camera 660, microphones 670 and 675, and propellers 610-640 as shown in FIG. 6A. The drone may mount the camera 660 below the drone and mount at least one microphone at the bottom (e.g., the camera 660) of the drone as shown in FIG. 6A. FIG. 6A depicts the example where the first microphone 670 is mounted near the camera 660, and the second camera 675 is mounted in other longitudinal section (e.g., the back of the main board 600) of the main board 600 where the camera 660 is mounted. While the microphones 670 and 675 are disposed at the front and the back of the main board 600 in FIG. 6A, they may be mounted at either side of the main board 600. Also, the drone may mount four microphones at the main board 600, and their mounting positions may be on the front and back sides and both sides of the main board 600. In addition, the microphone may be mounted in all or part of connecting portions 681-684 of the main board 600 and the propellers 610-640.

Figure 6B:
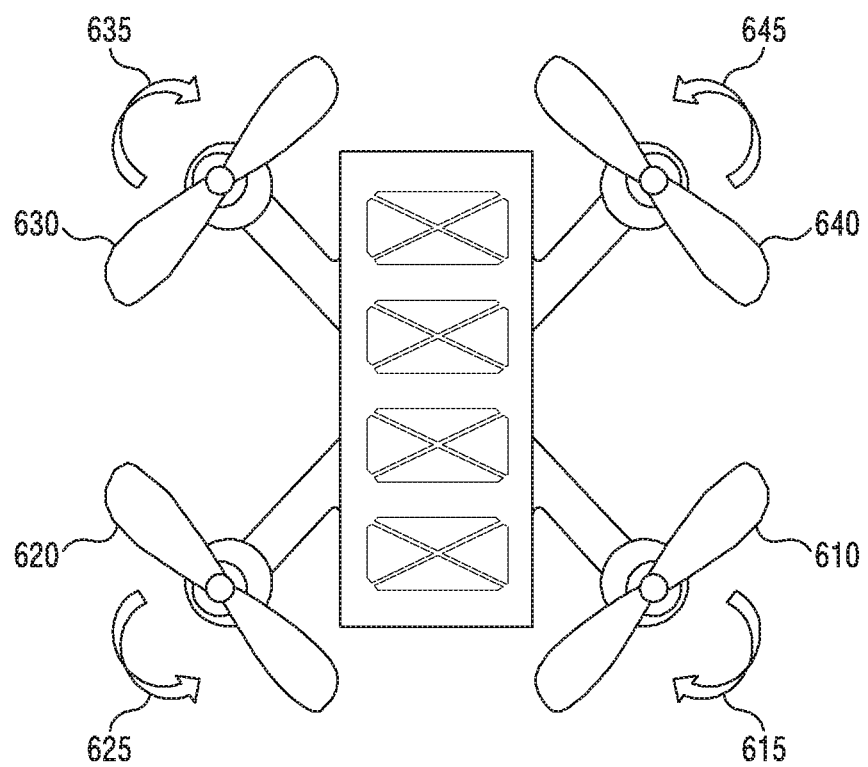

FIG. 6B is the diagram for illustrating operations of the drone. The drone may have the same rotation direction of opposite propellers and opposite rotation directions of neighboring propellers. In case of the quadcopter as an example, two propellers 610 and 630 of the four propellers 610-60 may spin clockwise as shown in 615 and 635, and two propellers 620 and 640 may spin counterclockwise as shown in 625 and 645. The propellers may spin in the different directions because of momentum conservation. For example, if the four propellers spin in the same direction, the drone may keep turning in one direction according to the conservation of momentum. The direction change by controlling rotation speeds of the propellers of the drone may also be an example of using the conservation of momentum.

According to an embodiment, operations for controlling the attitude and the flight of the drone may be fulfilled by a movement control module (e.g., the movement control module 510 of FIG. 5). The movement control module may analyze information collected by a sensor module (e.g., the sensor control module 530 of FIG. 5) and thus recognize a current state of the drone. The movement control module may utilize some or all of a gyro sensor for measuring angular momentum of the drone, an acceleration sensor for measuring acceleration momentum of the drone, a terrestrial magnetism sensor for measuring terrestrial magnetism of the earth, a barometer for measuring the altitude, and a GPS module (e.g., the GPS module 555 of FIG. 5) for outputting three-dimensional position information of the drone. The movement control module may control rotations of the propellers 610-640 based on the measurement information outputted from the sensor module and the GPS module so that the drone may keep its balance during the flight.

The movement control module may stably control the flight of the drone by analyzing the measurement results of the sensor module and the GPS module. Forward, backward, left, and right movements of the drone may be achieved by increasing the propeller rotation speed on the opposite side of an intended direction. The same effect may be achieved by lowering the propeller rotation speed of the intended direction to move. If turning the drone, the movement control module may adjust the rotational speed of two facing propellers, that is, two propellers spinning in the same direction. If the momentum of the propeller spinning in one direction is predominant, the balance is disrupted and the drone may turn in the opposite direction. For example, if the movement control module increases the rotational speed of the propellers 610 and 630 spinning clockwise, the drone may change its direction counterclockwise. Also, if the movement control module lowers the rotational speed of every propeller, the drone may descend, and if increasing the rotational speed, the drone may ascend.

The drone may change the direction and move vertically and horizontally in a multidimensional (e.g., three dimensional) space. For example, in case of a quadcopter, the drone may perform ascend, descend, left direction change, and right direction change operations, and move forward, backward, left and right by controlling the rotations of the propellers 610-640. The drone may control the movement of the drone with four commands as shown in Table 1.

TABLE 1

| | |
|---|---|
| Ascend or Descend | Throttle |
| Left direction change or Right direction change | Yaw |
| Forward or Backward | Pitch |
| Left or Right | Roll |

Figure 6C:
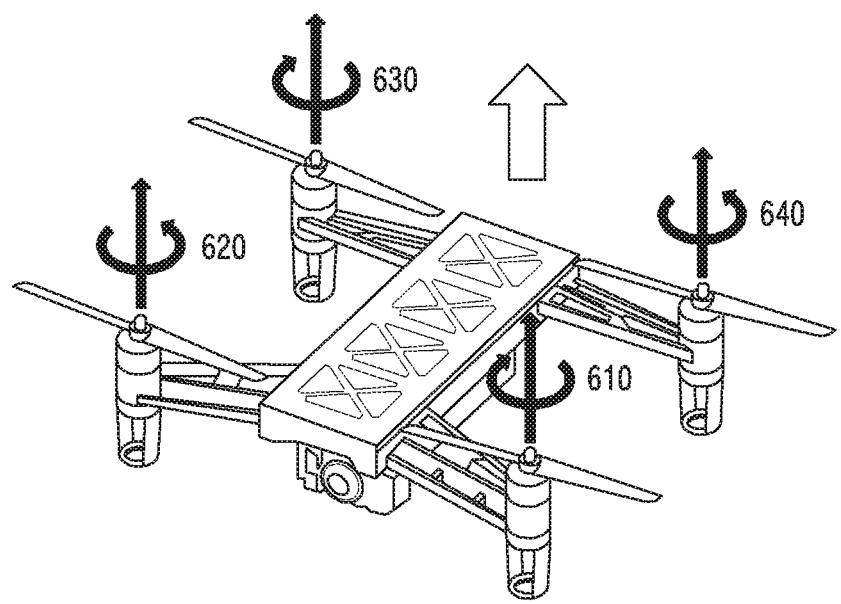
Figure 6D:
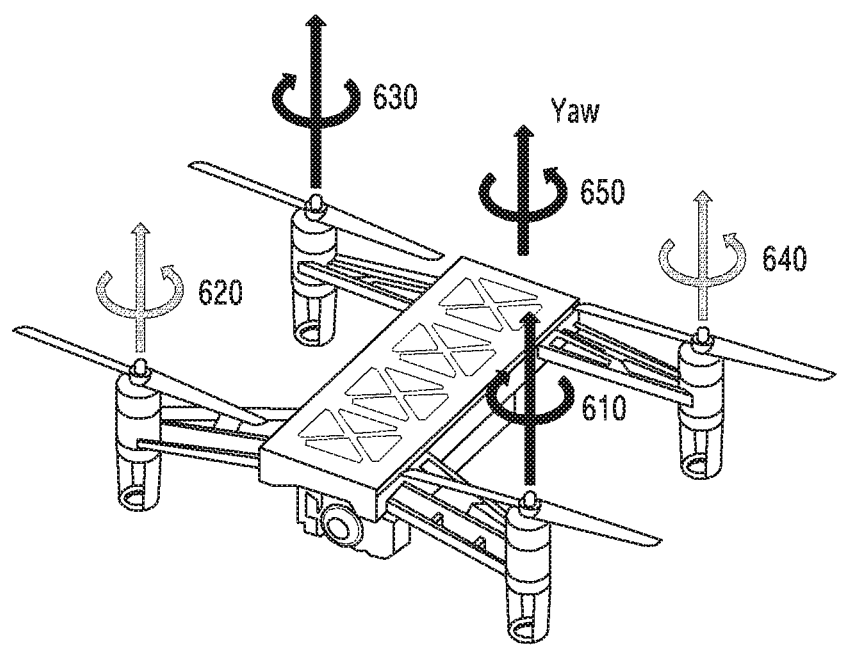

FIGS. 6C-6D are the diagrams for illustrating examples of controlling the drone movement. For example, the drone may be a quadcopter. The quadcopter may control its flight direction and movement by combining rotation intensities of the four propellers 610-640. The drone may ascend if a revolution per minute (RPM) of the four propellers 610-640 is increased simultaneously as shown in FIG. 6C, and the drone may descend if the RPM is decreased at the same time. Likewise, the drone may move forward by increasing the RPM of the propellers 610 and 620, move backward by increasing the RPM of the propellers 630 and 640, move to the left by increasing the RPM of the propellers 610 and 640, and move to the right by increasing the RPM of the propellers 620 and 630. If the diagonal propellers 610 and 630 or 620 and 640 are rotated harder than the other diagonal propellers as shown in FIG. 6D, the drone direction may change to the left or the right.

FIG. 7 is a diagram for illustrating operations for controlling a movement of a drone using an electronic device.

A drone 790 may include a movement control module (e.g., the movement control module 510 and a movement module 520 of FIG. 5)) for controlling flying attitude and flight and an application processing module (e.g., the application processor 505 of FIG. 5) for controlling an application of the drone 790. The movement control module is a platform hub of the drone 790, and may be connected to various hardware and sensors of the drone 790 to achieve autonomous flight. The application processing module is an application core, and may include an OS and provide an application for driving hardware and software by providing an API. The application processing module and the movement control module may control movement and noise suppression function of the drone 790 in a photographing mode.

To move the drone 790 to a particular position (e.g., a position having composition of an image taken by a camera module (e.g., the camera module 560 of FIG. 5), a photographing position), the movement control module may obtain information through the application processing module and control the drone 790 to move to a corresponding destination based on the obtained information.

In addition, the drone 790 may be remotely controlled by an electronic device 700 (e.g., a smart phone).

As shown in FIG. 7, the electronic device 700 may display on a screen a first jog button 710 and a second jog button 720 for controlling the movement of the drone 790. The first jog button 710 and the second jog button 720 may be activated by a user touch, and the electronic device 700 may transmit a command for controlling the movement of the drone 790 to the drone 790 according to a touch-and-drag direction. The application processing module of the drone 790 may forward the command transmitted from the electronic device 700 to the movement control module, and the movement control module may control the movement of the drone by controlling the movement module. For example, the first jog button 710 of the electronic device 700 may issue throttle and yaw commands, and the second jog button 720 may issue pitch and roll commands. The pitch may indicate forward and backward movements of the drone 790, and the roll may indicate left and right movements of the drone 790.

For example, if the user drags the second jog button 720 in a direction 741, the electronic device 700 may analyze a drag direction and a drag distance and transmit information regarding forward movement and movement speed to the drone 790. Next, the movement control module of the drone 790 may control RPMs of the propellers 610 and 620 to be greater than RPMs of the propellers 630 and 640 according to the speed information. The drone 790 may move forward in a direction 751. If the user touches and drags the second jog button 720 in a direction 743, the drone 790 may rotate the propellers 630 and 640 harder than the propellers 610 and 620 and move the drone 790 backward in a direction 753.

For example, in the same manner, if the user touches and drags the second jog button 720 in a direction 745, the drone 790 may rotate the propellers 610 and 640 harder than the propellers 620 and 630 and thus move the drone 790 to the left in a direction 755. If the user touches and drags the second jog button 720 in a direction 747, the drone 790 may move the drone 790 to the right in a direction 757 by rotating the propellers 620 and 630 harder than the propellers 610 and 640.

For example, if the user drags the first jog button 710 in a direction 761, the electronic device 700 may analyze a drag direction and a drag distance and transmit information regarding upward movement and movement speed to the drone 790. Next, the drone 790 may ascend by increasing the RPMs of the propellers 610-640 at the same time according to the speed information of the drone 790. If the user touches and drags the first jog button 710 in a direction 763, the drone 790 may descend by reducing the RPMs of the propellers 610-640.

The drone 790 may differently control the rotation directions of the propellers 610 and 630 and the propellers 620 and 640. For example, if the user drags the first jog button 710 in a direction 771, the drone 790 may change the direction of the drone 790 to the right by controlling to rotate the RPMs of the propellers 610 and 630 spinning clockwise harder than the propellers 620 and 640 spinning counterclockwise. If the user drags the first jog button 710 in a direction 773, the drone 790 may change the direction of the drone 790 to the left by controlling to rotate the RPMs of the propellers 620 and 640 spinning counterclockwise harder than the propellers 610 and 630 spinning clockwise.

As shown in FIG. 7, the user may control the movement speed and the direction change of the drone 790 by controlling the first jog button 710 or the second jog button 720 of the electronic device 700.

FIG. 8A-FIG. 8E are diagrams for illustrating level changes of an input signal according to a movement of a drone.

Figure 8A:
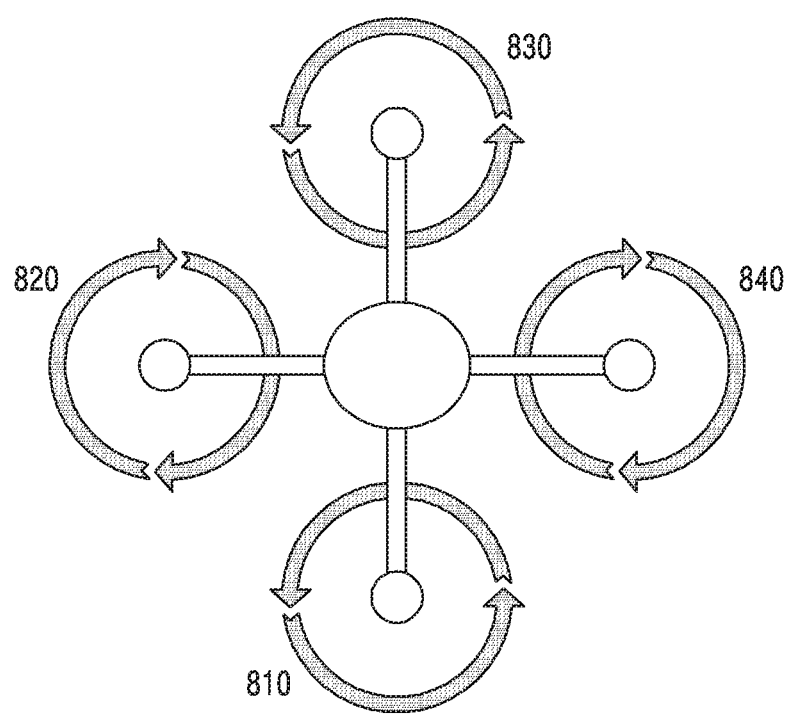
FIG. 8A-FIG. 8E are diagrams for illustrating level changes of an input signal according to a movement of a drone.
Figure 8B:
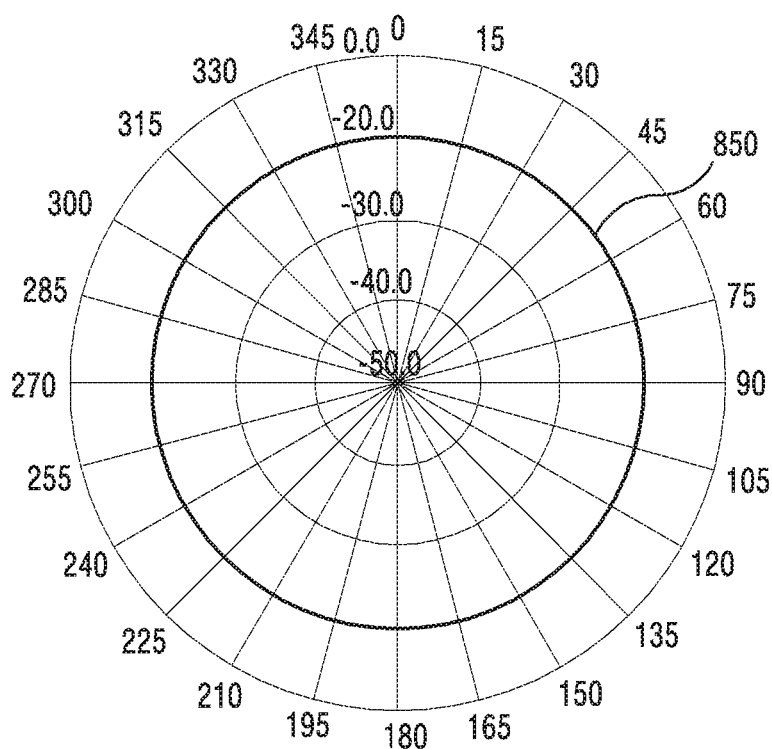

FIG. 8A may be the diagram illustrating that propellers 810-840 rotate at the same RPM, and FIG. 8B may be the example of the input level of the audio signal inputted to a microphone (e.g., the microphone 475 of FIG. 4, the microphone 575 of FIG. 5) while the propellers are rotated as shown in FIG. 8A. A processor (e.g., the mobile control module 510 of the processor 500 of FIG. 5) may forward the same motor driving data to a movement module (e.g., the motor drivers 521a-521d of the movement module 520 of FIG. 5), and thus the propellers 810-840 may be rotated at the same RPM. FIG. 8A may be a hovering, ascending, or descending state of the drone. If the propellers 810-840 of the drone rotate at the same RPM, the audio signal inputted to the microphone may have the same input level as shown in FIG. 8B, and the drone may perform the noise cancelling operation with the same level.

Figure 8C:
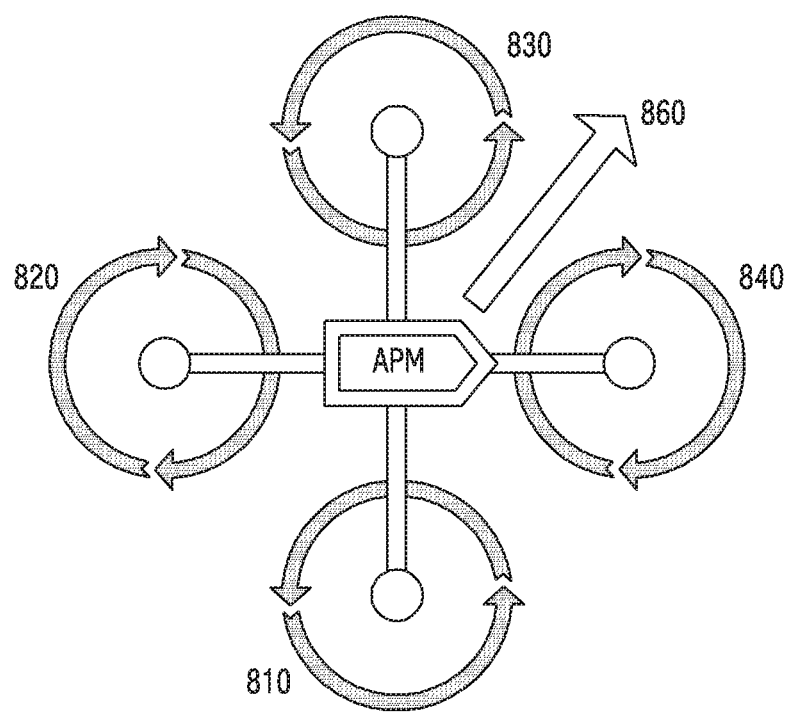
Figure 8D:
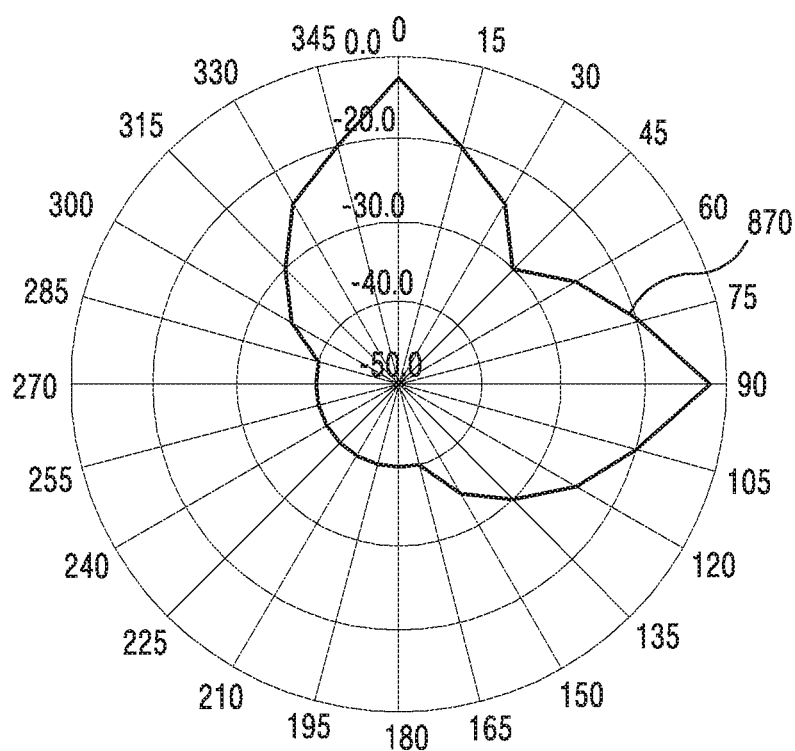
Figure 8E:
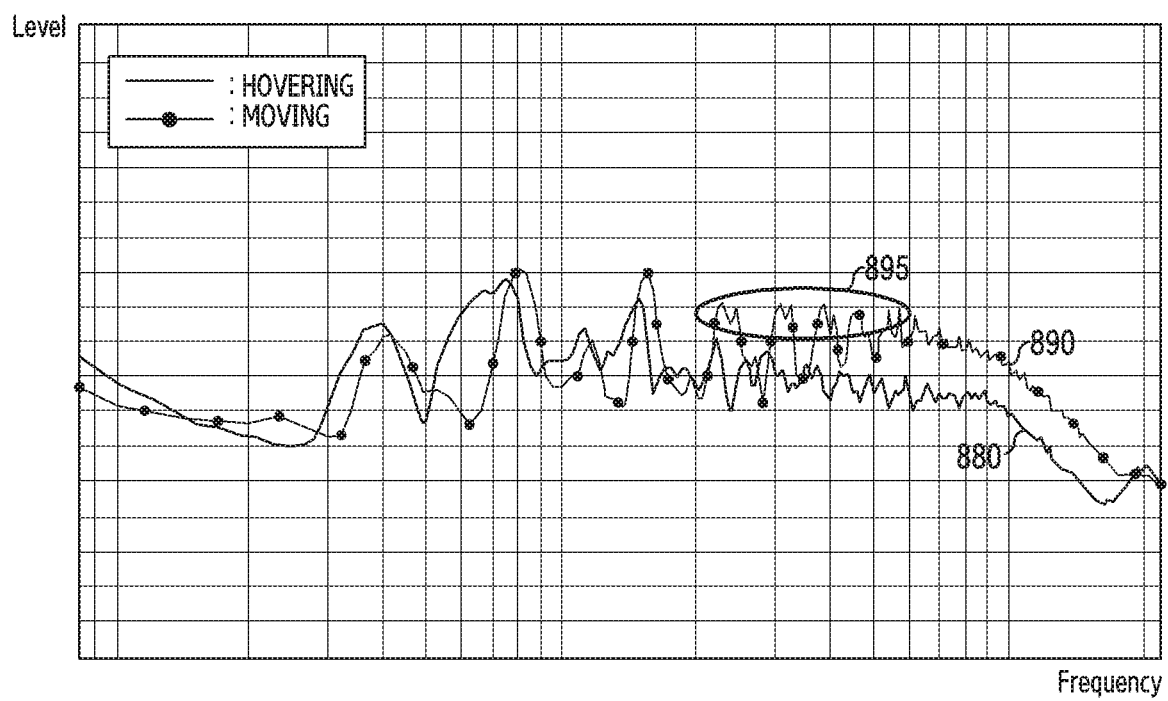

FIG. 8C may be the example where the RPM of the propellers 810 and 820 is greater than the RPM of the propellers 830 and 840, and in this case, the drone may move in a direction 860. FIG. 8D may be the example of the input level of the audio signal inputted to the microphone while the propellers rotate as shown in FIG. 8C. FIG. 8E is the diagram illustrating frequency response characteristics of the input signal according to the rotation of the propellers. 880 in FIG. 8E may be the input signal if the drone hovers, and 890 may be the input signal if the drone moves. If the RPM of the motor increases, harmonic component in a high frequency range increases like 890 as shown in FIG. 8E. Hence, if the RPM of the propeller increases, the high band level and the harmonic component may increase in the drone. For example, if the drone controls the RPM of the propellers 810-840 as shown in FIG. 8C, the input level of the microphone disposed in proximity to the propellers 810-840 may increase as shown in 870 of FIG. 8D. FIG. 8D depicts the example where the input level of the microphones disposed in proximity to the propeller 830 and the propeller 840 increases.

According to various embodiments of the present invention, the drone may analyze in advance noise characteristics according to the RPM change, and generate and store parameters for cancelling the noise according to a noise level and frequency characteristics based on analyzed results. The parameters may be control data, and mapped to the RPM value. The drone according to various embodiments of the present invention may access the control data based on the RPM applied to the motor of the movement module in the movement (e.g., the movement while executing a recording application), and cancel a noise included in an input audio signal of the microphone based on the accessed control data.

According to an embodiment, if the RPM of the motor is higher than a set threshold, the drone may turn off the microphone disposed at (or disposed near) a corresponding propeller. At least one microphone may be mounted in a main board (e.g., the main board 600 of FIG. 6) disposed at the bottom of the drone. The noise suppression module included in the audio module may be equipped in number corresponding to the number of the microphones. If the RPM of the motor exceeds the set threshold, the level and the harmonic component may increase as shown in FIG. 8E. Thus, it may be efficient to process the input signal of the microphone disposed on the side of the propeller where the motor RPM falls below the set threshold.

According to an embodiment, the drone may cancel the noise included in the audio signal based on the motor RPM and the signal inputted from the microphone.

Figure 9:
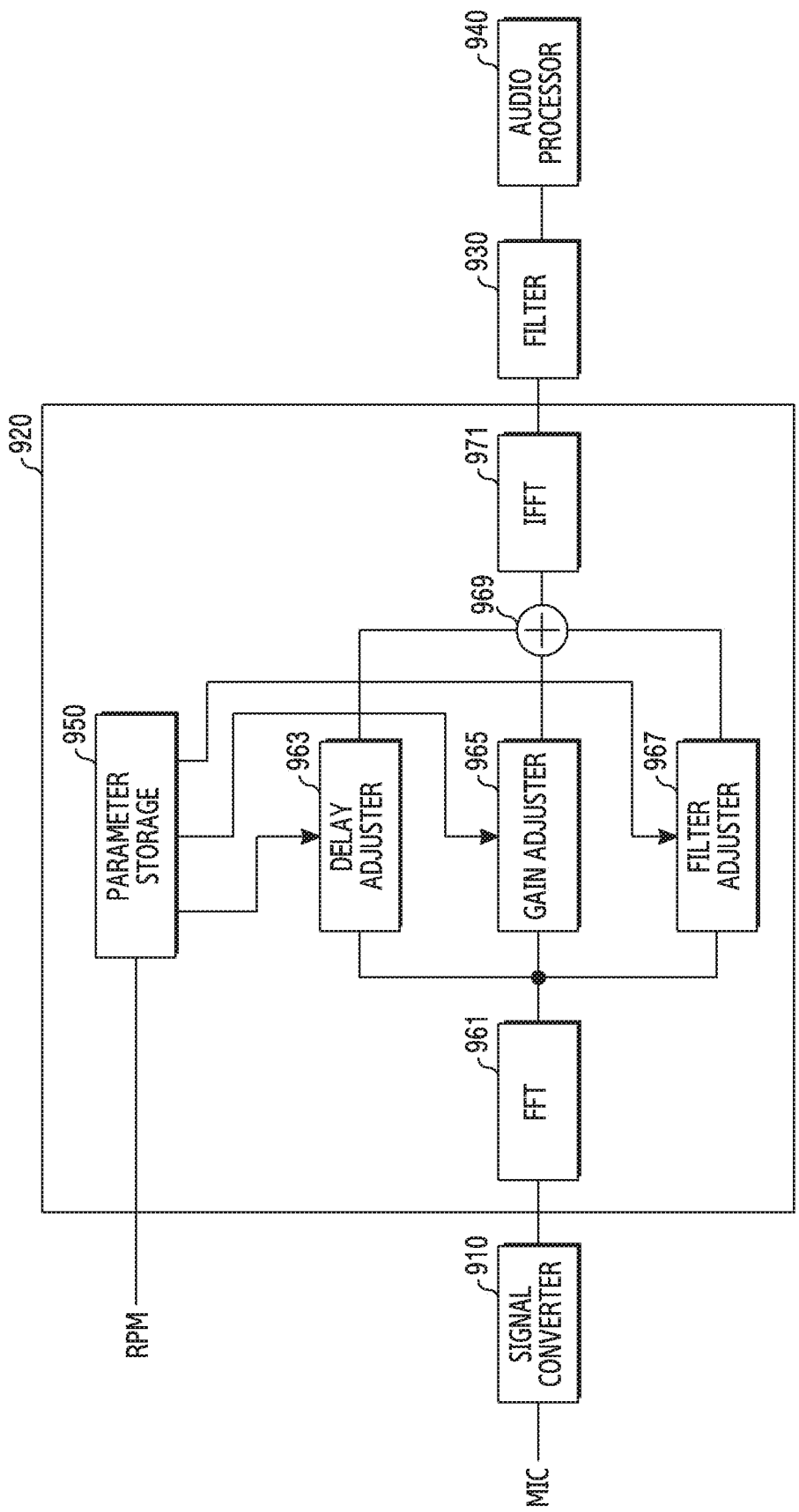
FIG. 9 is a diagram illustrating a configuration of a noise suppression module according to various embodiments of the present invention.

FIG. 9 is a diagram illustrating a configuration of a noise suppression module according to various embodiments of the present invention.

Referring to FIG. 9, a noise suppression module 920 may be included in an audio module (e.g., the audio module 470 of FIG. 4, the audio module 570 of FIG. 5). The noise suppression module 920 may be equipped in number corresponding to the number of microphones (e.g., the microphone 475 of FIG. 4, the microphone 575 of FIG. 5). For example, two microphones may be mounted on the front side and the back side or the left side and the right side of the main board mounted at the bottom of the drone as shown in FIG. 6A, or four may be mounted in the front and back sides and the left and right sides. The noise suppression module 920 may cancel a noise included in an audio signal inputted from the corresponding microphones respectively.

A parameter storage 950 may store parameters (e.g., control data) for the noise canceling based on motor driving data. For example, the drone may rotate the propeller by driving the motor and thus conduct movement and direction change of the drone. If the drone performs a recording operation, a sound noise may increase (e.g., if the propeller spins fast, the sound noise increases proportionally) in proportion to the rotation of the propeller. The drone according to various embodiments of the present invention may analyze noise characteristics (delay, level, frequency characteristic, etc.) according to the propeller rotation (motor RPM) change, and preset parameters (control data) for cancelling the analyzed noise characteristic. The control data may cancel at least one or more noise characteristics according to the motor RPM. For example, the control data may correspond to the motor RPM, and may include data for controlling a delay caused by the noise, a level (gain control) and/or frequency (filter coefficient) characteristics.

The parameter storage 950 may be positioned in a memory module (e.g., the memory module 440 of FIG. 4, the memory module 540 of FIG. 5). Alternatively, the parameter storage 950 may be positioned in the audio module. The parameter storage 950 may output the control data corresponding to motor driving data (e.g., RPM). For example, the control data may be mapped to the motor RPM. The control data may include at least one control data of delay control data for controlling a noise component, attenuation control data (e.g., attenuation coefficient) and/or filter control data (e.g., filter coefficient).

A signal converter 910 may amplify a signal received from a corresponding microphone, filter an audio band signal from the amplified signal, and convert the filtered audio signal to audio data.

A fast Fourier transform (FFT) 961 may perform a function for converting the audio data from a time domain to a frequency domain. A configuration for canceling the noise may include at least one of a delay adjuster 963, a gain adjuster 965 and/or a filter adjuster 967. The delay adjuster 963 may compensate for the audio signal delayed by the noise component with the control data. The gain adjuster 965 may compensate for a gain of the audio signal attenuated by the noise component with the control data. The filter adjuster 967 may remove a frequency of the noise component included in the audio signal with the control data. The audio data after the delay, the gain, and the frequency of the audio signal occurred by the noise component are compensated at the delay adjuster 963, the gain adjuster 965 and the filter adjuster 967 respectively may be logically added at an adder (mixer) 969. The audio data outputted from the adder 969 may be converted to a time function at an inverse FFT (IFFT) 971, and then filtered at a filter (post filter) 960. An audio processor 940 may process, record, and play the audio data outputted from the noise suppression module 920. The audio processor 940 may include an audio codec. The audio processor 940 may be included in an audio module (e.g., the audio module 470 of FIG. 4), or in a processor (the processor 400 of FIG. 4).

The parameter storage 950, the FFT 961, the delay adjuster 963, the gain adjuster 965, the filter adjuster 967, the adder 969 and the IFFT 971 in FIG. 9 may be the configuration of the noise suppression module 920. The noise suppression module 920 may cancel the noise included in the audio signal. According to various embodiments of the present invention, the noise in the audio signal may be canceled based on the delay of the audio signal, the gain, and at least one of the filters. The configuration for canceling the noise included in the audio signal is described with an example of a parallel configuration (e.g., the configuration of the delay adjuster 963, the gain adjuster 965, the filter adjuster 967, the adder 969). The configuration for canceling the noise in the audio signal may be performed in a serial configuration. For example, the noise suppression module 920 may configure the connections of the delay adjuster 963, the gain adjuster 965, and the filter adjuster 967 in series, and may sequentially control the delay, the gain and/or the frequency of the audio signal.

Figure 10:
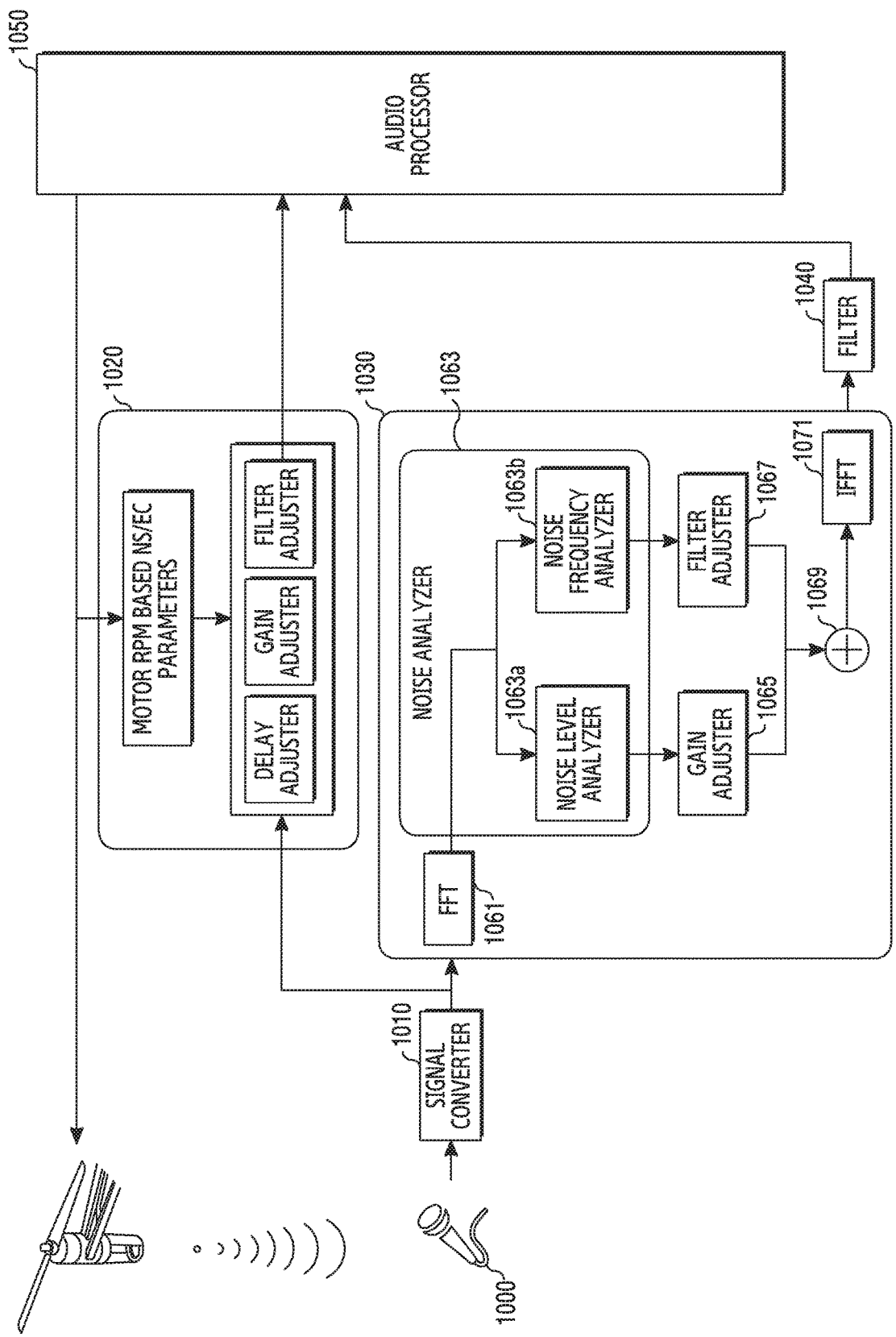
FIG. 10 is a diagram illustrating another configuration of a noise suppression module according to various embodiments of the present invention.

FIG. 10 is a diagram illustrating another configuration of a noise suppression module according to various embodiments of the present invention.

Referring to FIG. 10, the noise suppression module may include a first noise suppression module 1020 for canceling a noise occurring according to the motor RPM, and a second noise suppression module 1030 for extracting and canceling a noise in an input signal. The first noise suppression module 1020 may be configured as shown in FIG. 9.

A signal converter 1010 may filter and amplify an audio signal received from a microphone 1000, and convert the amplified audio signal to audio data.

An FFT 1061 may FFT convert the audio data. A noise analyzer 1063 may analyze the noise included in the audio data, and extract a noise level and a noise frequency based on analysis results. For example, the noise analyzer 1063 may detect the noise level in the audio data, and generate a control signal (hereinafter, an attenuation control signal) for attenuating a gain of the audio data according to the detected noise level. In addition, the noise analyzer 1063 may detect the noise frequency in the audio data, and generate a filter coefficient for removing the detected noise frequency. To this end, the noise analyzer 1063 may include a noise level analyzer 1063a for generating the attenuation control signal and a noise frequency analyzer 1063b for generating the filter coefficient. A gain controller 1065 may adjust the gain of the audio data with the generated attenuation control signal. A filter adjuster 1067 may adjust frequency characteristics of the audio data with the generated filter coefficient. The gain adjuster 1065 and the filter adjuster 1067 may perform a function for removing noise characteristics contained in the input audio signal. An adder 1069 may generate noise-free audio data by combining the outputs of the gain adjuster 1065 and the filter adjuster 1067. An IFFT 1071 may IFFT convert the FFT converted audio data. A post filter 1040 may post filter and output the IFFT converted audio data.

An audio processor 1050 may process, record and play the audio data outputted from the first noise suppression module 1020 and the second noise suppression module 1030. The audio processor 1050 may include an audio codec. The audio processor 1050 may be included in an audio module (e.g., the audio module 470 of FIG. 4), or in a processor (the processor 400 of FIG. 4). The audio processor 1050 may process the audio data (e.g., first audio data) outputted from the first noise suppression module 1020 and the audio data (e.g., second audio data) outputted from the second noise suppression module 1030 at the same time. The audio processor 1050 may selectively process the audio data outputted from the first noise suppression module 1020 and the second noise suppression module 1030 on the basis of the motor RPM. For example, if the motor RPM drastically changes (e.g., change from low-speed movement to high-speed movement and/or direction change, etc), the first noise suppression module 1020 may be activated and the second noise suppression module 1030 may be deactivated. For example, if the motor RPM drastically changes as in fast movement and direction change, a sound noise of the drone in the audio signal may considerably increase due to rapid rotations of propellers. In this case, the second noise suppression module 1030 may have difficulty in canceling the noise contained in the audio signal in real time. If the motor RPM change is considerable, the audio processor 1050 may record and play by activating the first audio data outputted from the first noise suppression module 1020.

According to an embodiment, if a motor RPM value exceeds a set reference value, the drone (e.g., the processor 400 of FIG. 4) may turn off a microphone disposed near a corresponding motor. An audio module connected to the turned-off microphone may not perform the audio signal processing operation. The drone (e.g., the processor 400 of FIG. 4) may turn on again the microphone which was turned off if the RPM value of the motor disposed near the turned off microphone falls below the set reference value.

According to an embodiment, the drone may control the movement and the direction switch by the remote control device. The drone may predict the motor RPM change by analyzing a control command transmitted from the remote control device. The drone may turn off a microphone disposed near a corresponding motor if the predicted motor RPM exceeds the set reference value. Next, the drone may turn on again the microphone which was turned off if the predicted RPM value of the motor disposed near the turned off microphone falls below the set reference value.

According to an embodiment, the drone may turn off the operation of the second noise suppression module 1030 if the movement speed and the direction change are rapidly conducted by the control command. If rapidly changing the movement speed of the drone (e.g., rapidly controlling the drone) or rapidly changing the direction, the motor RPM may also rapidly change. For example, if the motor RPM changes rapidly, the noise in the input audio signal may be inserted in various forms. In this case, the second noise suppression module 1030 may not cope with the noise change in the input audio signal, and in this case, it may be efficient to cancel the noise through the first noise suppression module 1020.

According to various embodiments of the present invention, an electronic device includes a movement module including a motor; an audio module including a first noise suppression module; a memory module for storing control data corresponding to driving data (RPM) of the motor; and a processor functionally coupled to the audio module, the movement module and the memory module, wherein the processor may set control data according to the driving data of the motor, and apply the set control data to the audio module so that the first noise suppression module suppresses or cancels a noise in an audio signal inputted to the audio module based on the control data.

According to various embodiments, the control data may be data for suppressing or canceling at least one of a level and a frequency of a noise occurred by a motor which rotates in response to the RPM.

According to various embodiments, the electronic device may be a drone, the movement module may include at least one motor and at least one propeller which rotates in response to an RPM of the at least one motor, and the audio module may suppress or cancel noise level and frequency in the input audio signal based on the control data applied by the processor.

According to various embodiments, a plurality of microphones may be positioned at a bottom of the drone, the audio module may be connected to the plurality of the microphones respectively, and if an RPM of one motor of the at least one motor exceeds a set reference value, the processor may turn off at least one microphone positioned near the one motor among the plurality of the microphones.

According to various embodiments, the processor may set and apply the control data corresponding to the RPM to an audio module which is connected to a microphone positioned near a motor of which the RPM falls below the reference value among the at least one motor, and the audio module may suppress or cancel a noise in an audio signal which is inputted through the microphone positioned close to the motor of which the RPM falls below the reference value based on the control data.

According to various embodiments, if predicting that the RPM of one of the at least one motor exceeds the reference value based on a control command transmitted from a remote control device which controls movement of the drone, the processor may turn off at least one microphone positioned near a corresponding motor.

According to various embodiments, the reference value may be the RPM value of the at least one motor wherein a noise of the at least one propeller exceeds a threshold.

According to various embodiments, if the RPM of the motor positioned near the turned-off microphone changes below the reference value, the processor may turn on the microphone which is turned off.

According to various embodiments, the audio module further include a second noise suppression module for analyzing the noise level and frequency characteristics in the input audio signal, and suppresses or cancels the noise by adjusting at least one of a gain and a filter coefficient of the input audio signal based on the analyzed level and frequency characteristics, and the processor may process to suppress or cancel the noise in the audio signal based on the first noise suppression module and the second noise suppression module.

According to various embodiments, if recognizing a change of the motor RPM, the processor may turn off the second noise suppression module, and turn on the second noise suppression module if the motor RPM becomes constant.

Figure 11:
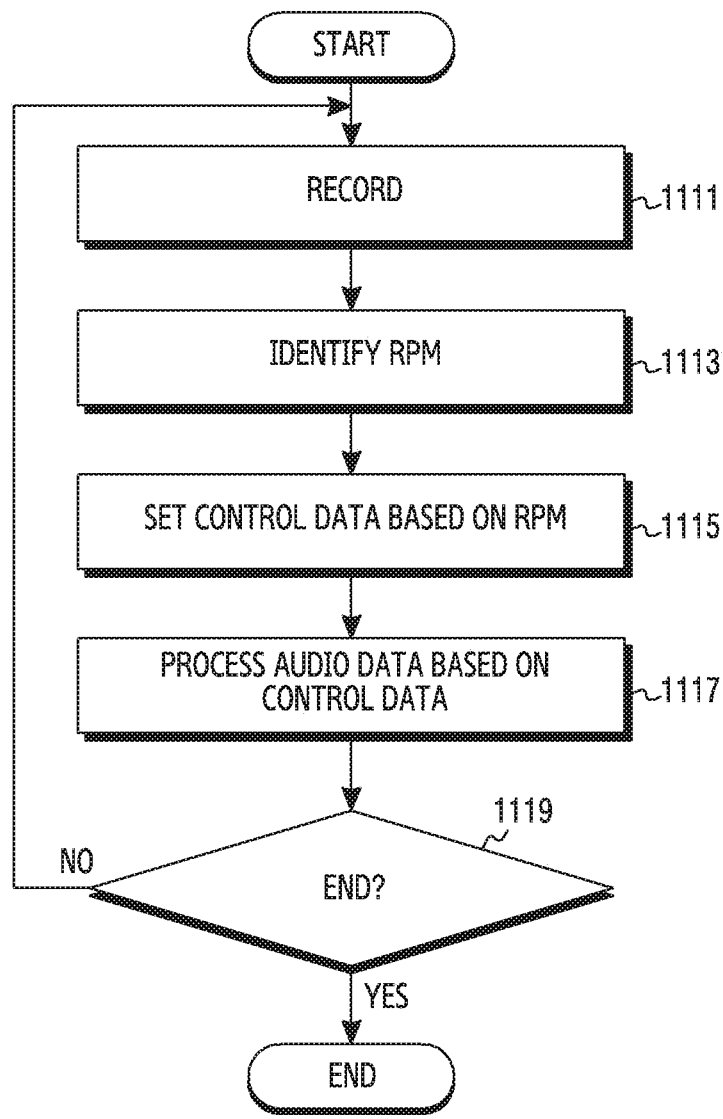
FIG. 11 is a flowchart illustrating a procedure for recording an inputted audio signal in a mobile recording device according to various embodiments of the present invention.

FIG. 11 is a flowchart illustrating a procedure for recording an input audio signal in an electronic device according to various embodiments of the present invention. The electronic device may be a drone.

Referring to FIG. 11, the drone (e.g., the processor 400 of FIG. 4) may execute a recording application in operation 1111. The recording application may be a video recording application. In the video recording application, the drone may move the drone by controlling a movement module (e.g., the movement module 420 of FIG. 4). In addition, the drone may process an image obtained by a camera module (e.g., the camera module 460 of FIG. 4), and process and store an audio signal inputted through the audio module 470.

The drone may identify motor driving data (RPM) transmitted to the movement module in operation 1213, and select control data corresponding to the RPM in operation 1115. The control data may be stored in a memory module (e.g. the memory module 440), or in the audio module 470. The control data is data for canceling a noise occurred by propeller rotations of the drone, and may be data for adjusting a delay, a gain and/or frequency characteristics of the input audio data. The drone may cancel the noise by processing the input audio data based on the control data in operation 1117.

If performing an audio recording mode, the drone may select the control data corresponding to the RPM of the motor, and cancel the noise of the input audio signal based on the selected control data. The drone may change the motor RPM according to the movement, and the audio module may cancel the noise contained in the input audio signal by selecting the control data according to the RPM change, and store the noise-free audio data. If the audio recording is finished, the drone may recognize it and terminate the recording operation in operation 1119.

The drone may move the drone forward, backward, to the left, to the right, upward, and downward by controlling the RPM of the plurality of motors/propellers. At this time, as the RPM changes, level/frequency (amplitude/frequency) characteristics of the input audio signal may change in real time. The drone according to various embodiments of the present invention may include a table which stores the control data based on the RPM. The drone may control the noise contained in the input audio signal in real time by identifying the RPM in the drone movement and selecting parameters (control data) corresponding to the identified RPM value.

Figure 12:
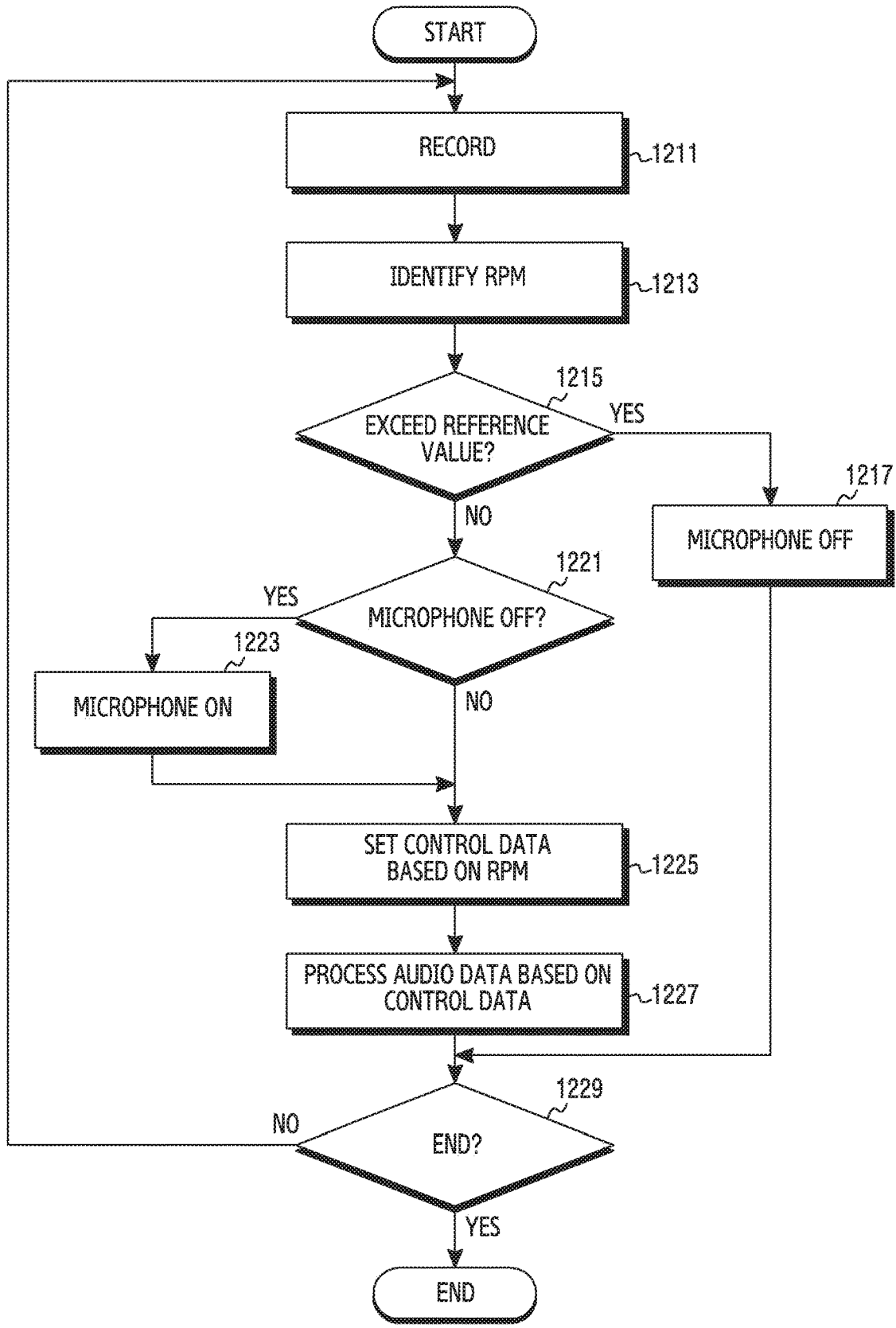
FIG. 12 is a flowchart illustrating a procedure for recording an inputted audio signal in a mobile recording device according to various embodiments of the present invention.

FIG. 12 is a flowchart illustrating a procedure for recording an input audio signal in an electronic device according to various embodiments of the present invention. The electronic device may be a drone.

Referring to FIG. 12, the drone (e.g., the processor 400 of FIG. 4) may execute a recording application in operation 1211. If executing the recording application, the drone may move the drone by controlling a movement module (e.g., the movement module 420 of FIG. 4). For example, if the recording application is a video recording application, the drone may obtain an image through a camera module (e.g., the camera module 460 of FIG. 4) while hovering or moving, and receive an audio signal through the audio module 470.

The drone may identify motor driving data (RPM) transmitted to the movement module in operation 1213. The drone may move by rotations of the propellers, and the RPM value of the motor may increase according to the movement speed. Hence, the noise may also increase in proportion to the RPM value of the motor. The movement of the drone may be forward movement, backward movement, left movement, right movement, ascend, descend, and so on. Further, the movement of the drone may include the direction change. In so doing, the forward movement, the backward movement, the left movement, the right movement and the direction change of the drone may have greater propeller rotation at a specific position than the propeller rotation of other position. In this case, a noise level generated by the propeller may differ. In an embodiment, the drone may turn off a microphone mounted at a position of relatively greater propeller rotation (at a position where a louder noise generated by the propeller rotation occurs (or flows)), and turn on a microphone mounted at a position where a relatively less noise occurs (or flows). For example, the drone may turn off a microphone positioned near a propeller which rotates fast and receive an audio signal inputted through a microphone mounted at other position.

After identifying the RPM in 1213 operation, the drone may examine whether the identified RPM value exceeds a set reference value in operation 1215. The reference value may be a set motor RPM threshold value. The reference value may be a difference between the RPM value of the motor rotating fast and the RPM value of the motor rotating slowly. If the motor RPM value falls below the set reference value, a status of the microphone may be identified in operation 1221. If the microphone is the off state, the drone may turn on the microphone in operation 1223, and maintain the on state if the microphone is the on state.

With the microphone turned on, the drone may select control data corresponding to the identified RPM in operation 1225. The control data may be stored in a memory module (e.g. the memory module 440), or in an audio module (the audio module 470 of FIG. 4). The control data may be control data for adjusting a delay, a gain and/or frequency characteristics of input audio data. The drone may cancel a noise by processing the input audio data based on the control data in operation 1227.

If the identified RPM value exceeds the reference value in operation 1215, the drone may turn off the microphone in operation 1217. The drone may turn off the microphone mounted at a corresponding position if the motor RPM value exceeds the reference value (the set threshold value). If the microphone is turned off, a noise suppression module connected to the corresponding microphone is deactivated not to process the input audio signal.

If recording, the drone may perform operation 1211-operation 1229 and concurrently perform the microphone driving control and the noise canceling operation. If the recording ends, the drone may recognize this in operation 1229 and finish the audio processing operation.

Also, the drone may perform the movement (forward/backward movement, left/right movement, ascend/descend, etc) according to a control command of the remote control device. The drone may predict the RPM change of the motor by analyzing the control command transmitted from the remote control device. For example, if a user of the remote control device issues a control command for fast movement, the drone may analyze the control command and thus predict the fast movement of the drone (the motor RPM for the fast movement). Although not depicted in FIG. 12, if the predicted motor RPM exceeds the set reference value, the drone may generate data for turning off a microphone mounted at a corresponding motor position (or a position close to the motor).

The drone may include a plurality of microphones, and the audio module may include noise suppression modules for canceling noises of audio signals inputted from the respective microphones. If performing the recording operation, if the motor RPM exceeds the set reference value, the drone may turn off a microphone positioned at (or positioned near) a corresponding motor (or propeller), and turn on a microphone positioned at (or positioned near) a motor of the relatively small RPM. If the microphone is turned off, the audio module (e.g., the noise suppression module) for processing the input audio signal of the corresponding microphone may be deactivated. The drone may improve the noise canceling capability by turning off the microphone to which a considerable propeller noise may be inputted and receiving the audio signal through the microphone to which a small noise may be inputted.

Figure 13:
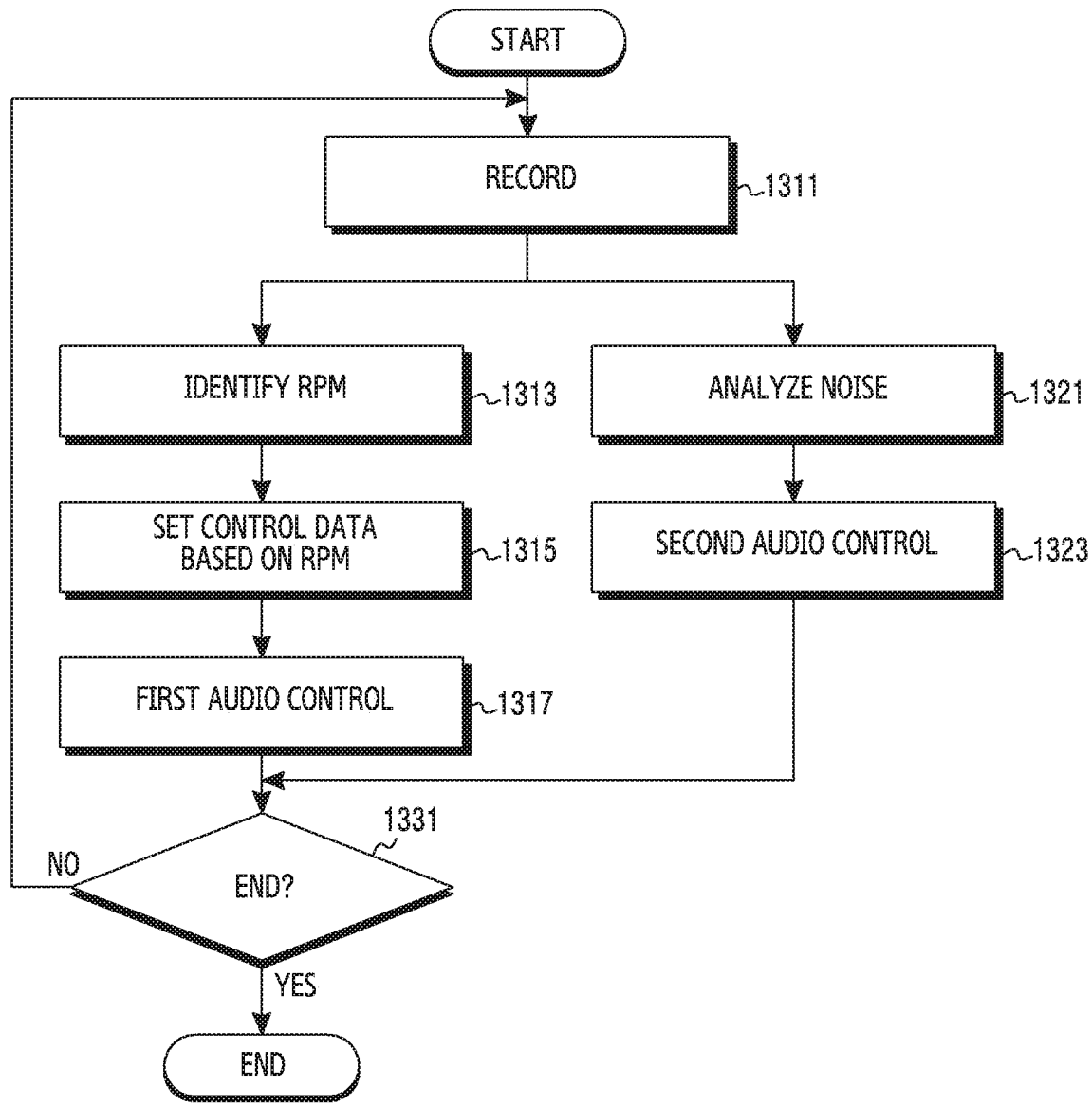
FIG. 13 is a flowchart illustrating a procedure for recording an inputted audio signal in a mobile recording device according to various embodiments of the present invention.

FIG. 13 is a flowchart illustrating a procedure for recording an input audio signal in an electronic device according to various embodiments of the present invention. The electronic device may be a drone.

Referring to FIG. 13, the drone (e.g., the processor 400 of FIG. 4) may execute a recording application in operation 1311. If the recording application is running, the drone may move the drone by controlling a movement module (e.g., the movement module 420 of FIG. 4). For example, if the recording application is a video recording application, the drone may obtain an image through a camera module (e.g., the camera module 460 of FIG. 4), and receive an audio signal through the audio module 470.

The drone may cancel a noise (e.g., first audio control) included in an input audio signal based on the motor RPM, and cancel the noise (second audio control) by analyzing the noise included in the input audio signal of the microphone. As for the first audio control operation, the drone may identify the RPM in operation 1313, set control data according to the identified RPM in operation 1315, and cancel the noise (first audio control) included in the input audio signal based on the set control data in operation 1317. Operation 1313-operation 1317 may be executed through the procedure of FIG. 11 or FIG. 12.

As for the second audio control operation, the drone may analyze the noise included in the input audio signal in operation 1321. The analyzed noise may be a noise level and a noise frequency. The drone may adjust the audio signal (second audio control) based on the analyzed noise in operation 1323. For example, the drone may adjust a gain of the audio signal based on the noise level, and adjust a filter of the audio signal based on noise frequency characteristics. The drone may process and store the audio signal of the adjusted gain and frequency characteristics.

According to an embodiment, in the first audio control operation, if the motor RPM value exceeds a set reference value, the drone may turn off a microphone positioned close to a corresponding motor.

According to an embodiment, if the predicted motor RPM value exceeds the set reference value, the drone in the first audio control operation may turn off a microphone positioned close to a corresponding motor. The drone may be controlled by a remote control device in movement and direction change, and predict a motor RPM change by analyzing a control command transmitted from the remote control device.

According to an embodiment, if the movement speed and the direction change are conducted rapidly, the drone may turn off the second audio control operation. The second audio control operation which analyzes and cancels the noise included in the input audio signal at the movement speed change and the direction change of the drone may not cope with the noise change included in the input audio signal, and in this case, it may be efficient to cancel the noise through the first noise suppression module 1020.

The drone may cancel the noise included in the audio signal based on the motor RPM and the input audio signal. According to various embodiments of the present invention, the drone may cancel noises generating at the motor and the propeller based on the RPM, and analyze and cancel an audio signal inputted through the microphone. According to an embodiment, if the drone cancels the noise based on the RPM at the RPM change and the RPM of the drone maintains a constant value, the noise included in the input audio signal may be canceled by analyzing the RPM and the input audio signal.

According to various embodiments of the present invention, an operating method of an electronic device may include receiving an audio signal; and first audio controlling for canceling a noise in the received audio signal, wherein the first audio controlling may include identifying driving data (RPM) of at least one motor of the electronic device; setting control data for suppressing or canceling a noise generated by at least one motor which rotates in response to the identified RPM; and suppressing or canceling a noise in the received audio signal based on the set control data.

According to various embodiments, the control data may include at least one of data for controlling a level and data for controlling a frequency of a noise occurred by rotation of the motor.

According to various embodiments, the electronic device is a drone including at least one motor and at least one propeller which rotates in response to the RPM of the at least one motor, and suppressing or canceling the noise in the received audio signal may suppress or cancel a noise level and frequency characteristics in the received audio signal.

According to various embodiments, turning off at least one microphone positioned near a motor of which the RPM falls below a set reference value may be further included.

According to various embodiments, checking a state of the microphone if the RPM falls below the set reference value; and if the microphone is turned off, turning on the microphone and setting the control data may be further included.

According to various embodiments, turning on the microphone which is turned off if the RPM of the motor positioned near the turned-off microphone changes below the reference value may be further included.

According to various embodiments, identifying a state of the microphone positioned near a corresponding motor if the RPM falls below the set reference value; and turning on the microphone positioned near the corresponding motor if the microphone positioned near the corresponding motor is turned off may be further included.

According to various embodiments, predicting the RPM change of the at least one motor based on a control command transmitted from a remote control device which controls movement of the electronic device; and turning off a microphone positioned near the motor of which the predicted RPM exceeds the set reference value may be further included.

According to various embodiments, the reference value may be the RPM value of the at least one motor where a noise of the at least one propeller exceeds a threshold.

According to various embodiments, second audio controlling is further included, wherein the second audio controlling may include analyzing noise level and frequency characteristics in the received input audio signal; and suppressing or canceling the noise by adjusting at least one of a gain and a filter coefficient of the received audio signal based on the analyzed level and frequency characteristics.

According to various embodiments, controlling not to perform the second audio controlling if the RPM change of the motor is recognized, and to perform the second audio controlling if the RPM of the motor becomes constant may be further included.

Various embodiments of the present invention disclosed in the specification and the drawings are suggested for the explanations and the understanding of the technical disclosure, and are not intended to limit the scope of the present invention. Thus, the scope of the present invention should be construed to include all modifications or modified various forms based on the technical concept of various embodiments of the present invention.

What is claimed is:

1. A drone comprising:
    a movement circuitry comprising at least one motor and at least one propeller which rotates in response to rounds per minute (RPM) of the at least one motor;
    a plurality of microphones positioned at a bottom of the drone;
    an audio circuitry connected to the plurality of the microphones respectively and comprising a first noise suppression circuitry;
    a memory circuitry for storing control data corresponding to driving data in RPM of the motor; and
    a processor functionally coupled to the audio circuitry, the movement circuitry and the memory circuitry, the processor being configured to:
        set control data according to the driving data of the motor,
        apply the set control data to the audio circuitry so that the first noise suppression circuitry suppresses or cancels a noise in an audio signal inputted to the audio circuitry based on the control data, and
        when an RPM of one motor of the at least one motor exceeds a set reference value, turn off at least one microphone positioned near the one motor among the plurality of the microphones.

2. The drone of claim 1, wherein the control data is data for suppressing or canceling at least one of a level and a frequency of a noise occurred by a motor which rotates in response to the RPM.

3. The drone of claim 1,
    wherein the processor sets and applies the control data corresponding to the RPM to an audio circuitry which is connected to a microphone positioned near a motor of which the RPM falls below the reference value among the at least one motor, and
    wherein the audio circuitry suppresses or cancels a noise in an audio signal which is inputted through the microphone positioned close to the motor of which the RPM falls below the reference value based on the control data.

4. The drone of claim 1, wherein, if predicting that the RPM of one of the at least one motor exceeds the reference value based on a control command transmitted from a remote control device which controls movement of the drone, the processor turns off at least one microphone positioned near a corresponding motor.

5. The drone of claim 1, wherein the reference value is the RPM value of the at least one motor when a noise of the at least one propeller exceeds a threshold.

6. The drone of claim 1, wherein, if the RPM of the motor positioned near the turned-off microphone changes below the reference value, the processor turns on the microphone which is turned off.

7. The drone of claim 1, wherein the audio circuitry further comprises:
    a second noise suppression circuitry for analyzing noise level and frequency characteristics in a input audio signal, and suppresses or cancels the noise by adjusting at least one of a gain of an amplifier or a filter coefficient of a filter of the second noise suppression based on the analyzed noise level and frequency characteristics, and
    the processor processes to suppress or cancel the noise in the audio signal based on the first noise suppression circuitry and the second noise suppression circuitry.

8. The drone of claim 7, wherein, if recognizing a change of the motor RPM, the processor turns off the second noise suppression circuitry, and turns on the second noise suppression circuitry if the motor RPM becomes constant.

9. An operating method of a drone including at least one motor and at least one propeller which rotates in response to rounds per minute (RPM) of the at least one motor, comprising:
    receiving an audio signal; and
    first audio controlling for canceling a noise in the received audio signal,
    wherein the first audio controlling comprises:
        identifying driving data in RPM of at least one motor of the drone,
        setting control data for suppressing or canceling a noise generated by at least one motor which rotates in response to the identified RPM,
        suppressing or canceling a noise in the received audio signal based on the set control data, and
        when an RPM of one motor of the at least one motor exceeds a set reference value, turning off at least one microphone positioned near the one motor among a plurality of microphones.

10. The method of claim 9, wherein the control data comprises at least one of data for controlling a level and data for controlling a frequency of a noise occurred by rotation of the motor.

11. The method of claim 9, further comprising:
    turning on the microphone which is turned off if the RPM of the motor positioned near the turned-off microphone changes below the reference value.

12. The method of claim 9, further comprising:
identifying a state of the microphone positioned near a corresponding motor if the RPM falls below the set reference value; and
turning on the microphone positioned near the corresponding motor if the microphone positioned near the corresponding motor is turned off.

13. The method of claim 9, further comprising:
predicting the RPM change of the at least one motor based on a control command transmitted from a remote control device which controls movement of the drone; and
turning off a microphone positioned near the motor of which the predicted RPM exceeds the set reference value.

14. The method of claim 9, wherein the reference value is the RPM value of the at least one motor when a noise of the at least one propeller exceeds a threshold.

15. The method of claim 9, further comprising:
second audio controlling,
wherein the second audio controlling comprises:
analyzing noise level and frequency characteristics in a received input audio signal, and
suppressing or canceling the noise by adjusting at least one of a gain of an amplifier or a filter coefficient of a filter of a second noise suppression based on the analyzed noise level and frequency characteristics.

16. The method of claim 15, further comprising:
controlling not to perform the second audio controlling if the RPM change of the motor is recognized, and to perform the second audio controlling if the RPM of the motor becomes constant.

* * * * *